(12) United States Patent
Pratt et al.

(10) Patent No.: US 8,230,889 B2
(45) Date of Patent: Jul. 31, 2012

(54) FLUID TRANSFER APPARATUS

(75) Inventors: Anthony Pratt, Paso Robles, CA (US);
Lee Gagnon, Paso Robles, CA (US)

(73) Assignee: Anthony Pratt, Paso Robles, CA (US)

(*) Notice: Subject to any disclaimer, the term of this patent is extended or adjusted under 35 U.S.C. 154(b) by 1050 days.

(21) Appl. No.: 12/218,520

(22) Filed: Jul. 15, 2008

(65) Prior Publication Data
US 2010/0011963 A1   Jan. 21, 2010

(51) Int. Cl.
*B65B 1/04* (2006.01)
(52) U.S. Cl. .................. 141/368; 141/263; 141/286
(58) Field of Classification Search ............ 141/94, 141/263, 269, 286, 312, 368; 215/358, 359; 217/78
See application file for complete search history.

(56) References Cited

U.S. PATENT DOCUMENTS

| | | | | |
|---|---|---|---|---|
| 2,882,061 A | * | 4/1959 | Johnson | 279/35 |
| 3,820,682 A | * | 6/1974 | Davella | 20/315 |
| 3,850,210 A | * | 11/1974 | Buxton | 141/312 |
| 4,826,029 A | | 5/1989 | Skoglie | |
| 5,073,258 A | | 12/1991 | Boullain, II | |
| 5,413,138 A | | 5/1995 | Astrom | |
| 5,641,094 A | | 6/1997 | Wunsch | |
| 5,702,018 A | | 12/1997 | Montgomery | |
| 6,161,716 A | | 12/2000 | Oberhofer | |
| 6,183,982 B1 | | 2/2001 | Nastasia | |
| 6,425,421 B1 | | 7/2002 | Morrison | |
| 6,478,178 B2 | | 11/2002 | Montgomery | |
| 6,508,163 B1 | | 1/2003 | Weatherill | |
| 6,508,168 B1 | | 1/2003 | Takahashi et al. | |
| 6,715,404 B2 | | 4/2004 | Pratt | |
| 6,871,678 B2 | | 3/2005 | Guszlovan | |
| 2007/0199199 A1 | | 8/2007 | Lake | |

* cited by examiner

*Primary Examiner* — Gregory Huson
*Assistant Examiner* — Jason K Niesz

(57) ABSTRACT

A fluid transfer apparatus includes a cam locking assembly and a cooperating seal member apparatus. The cam locking assembly is in communication with the cooperating seal member apparatus. The cam lock assembly is affixed or connected with the cooperating seal member apparatus through complementary threading in some preferred embodiments.

6 Claims, 26 Drawing Sheets

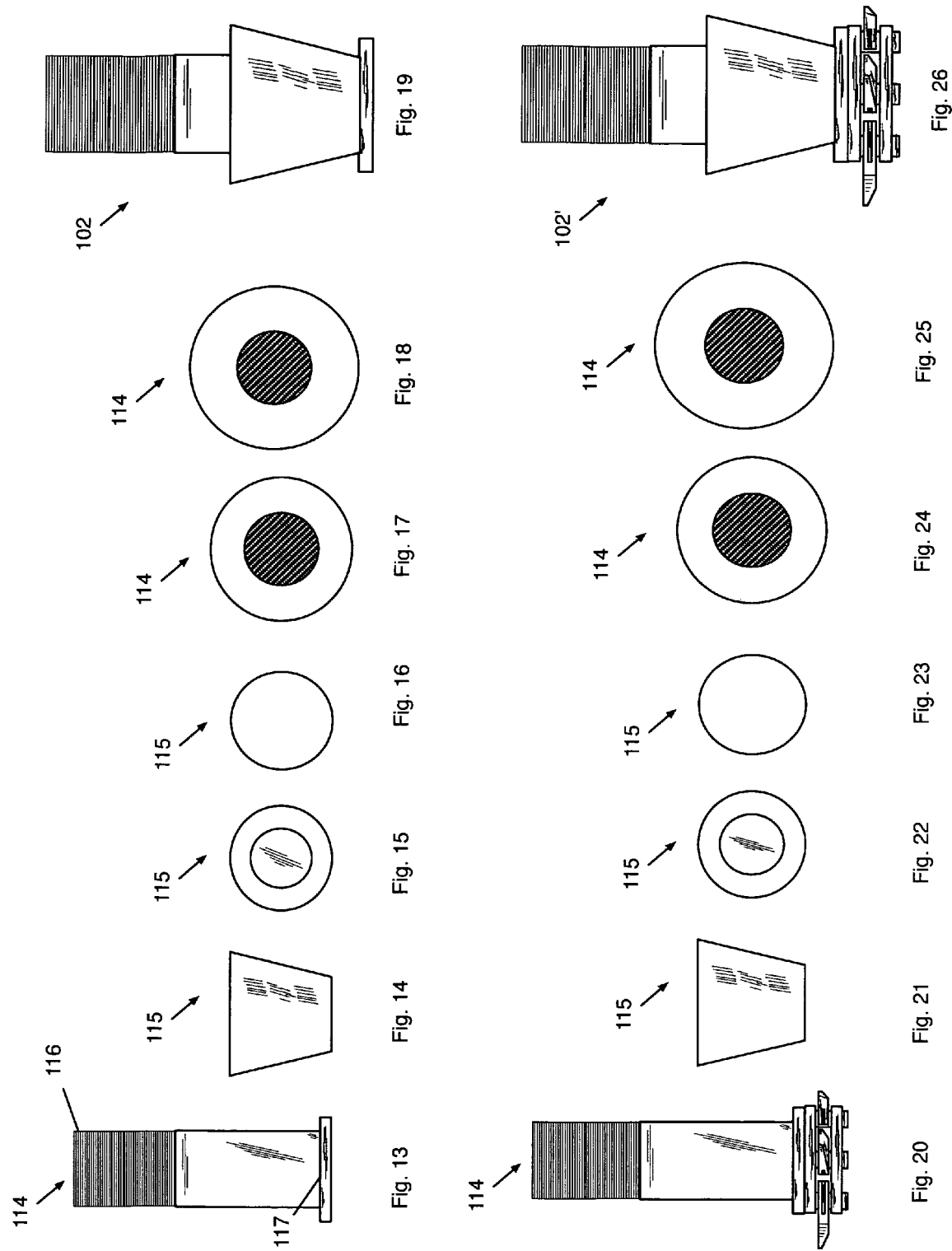

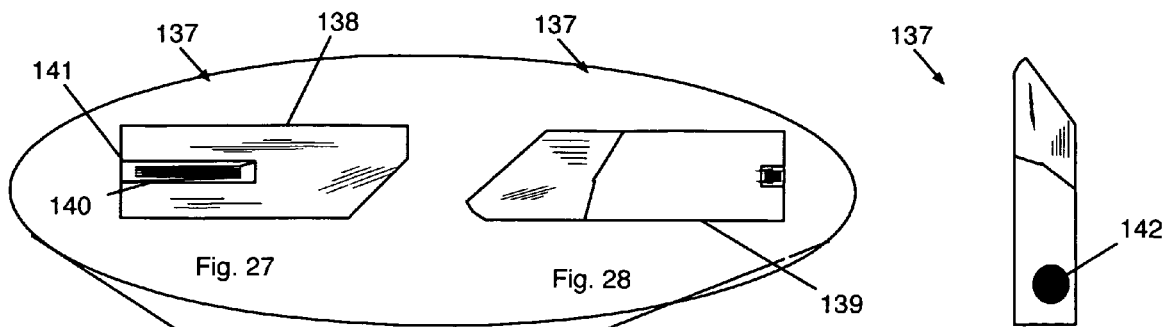
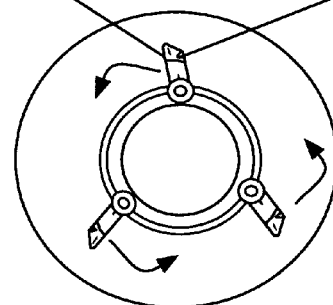
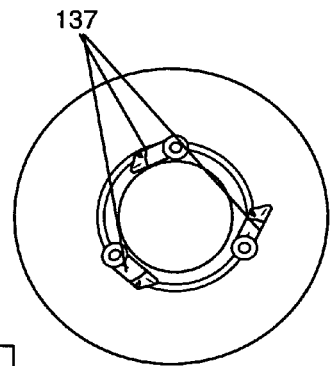
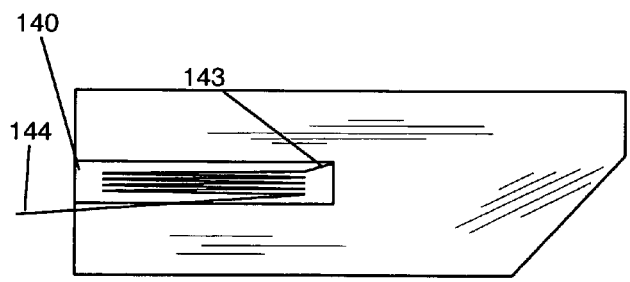
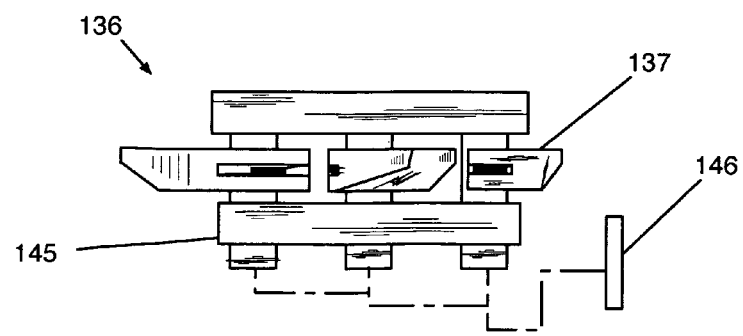

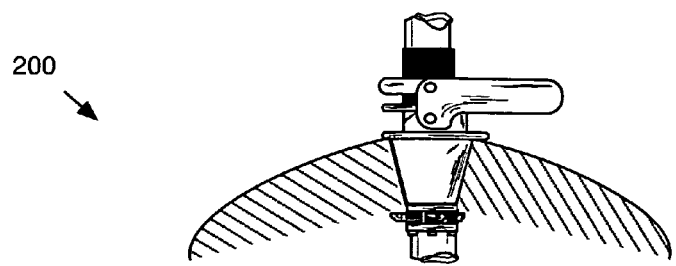
Fig. 43M
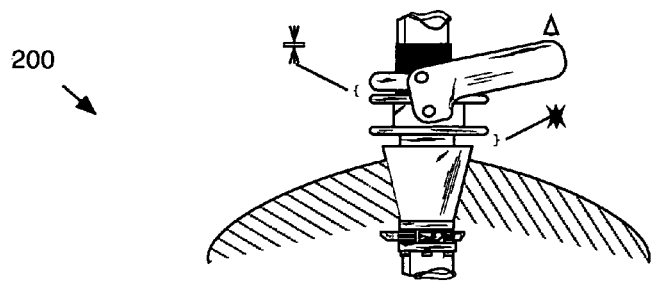
Fig. 43N
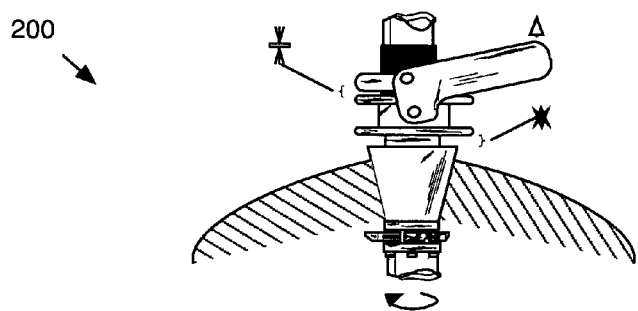
Fig. 43O
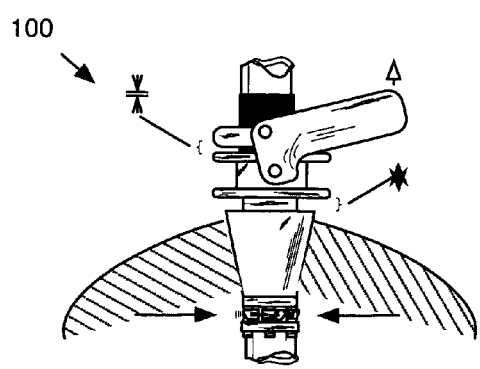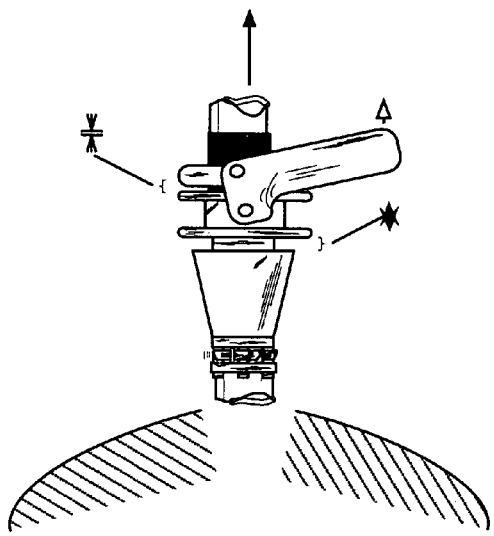
Fig. 43P

200

200

200

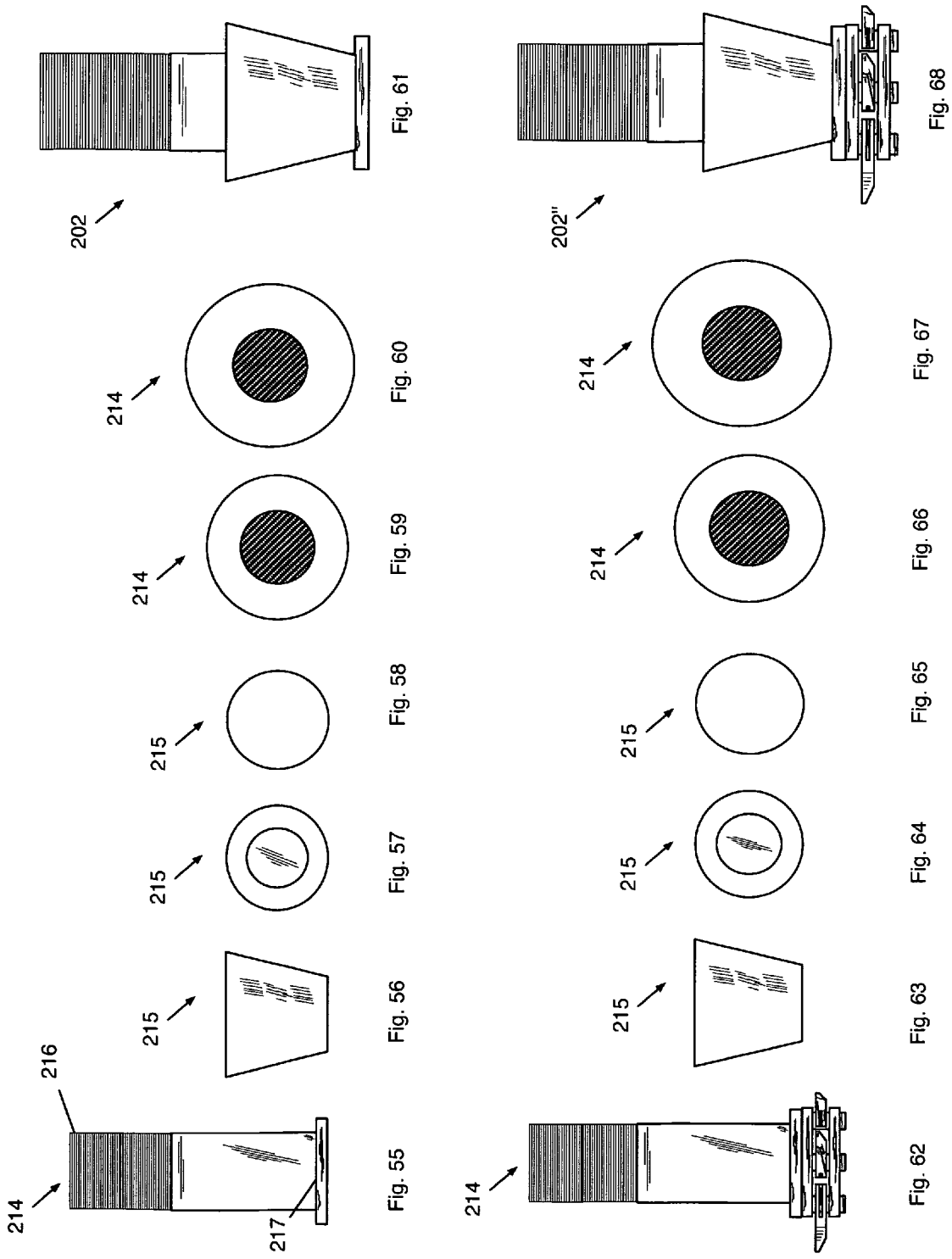

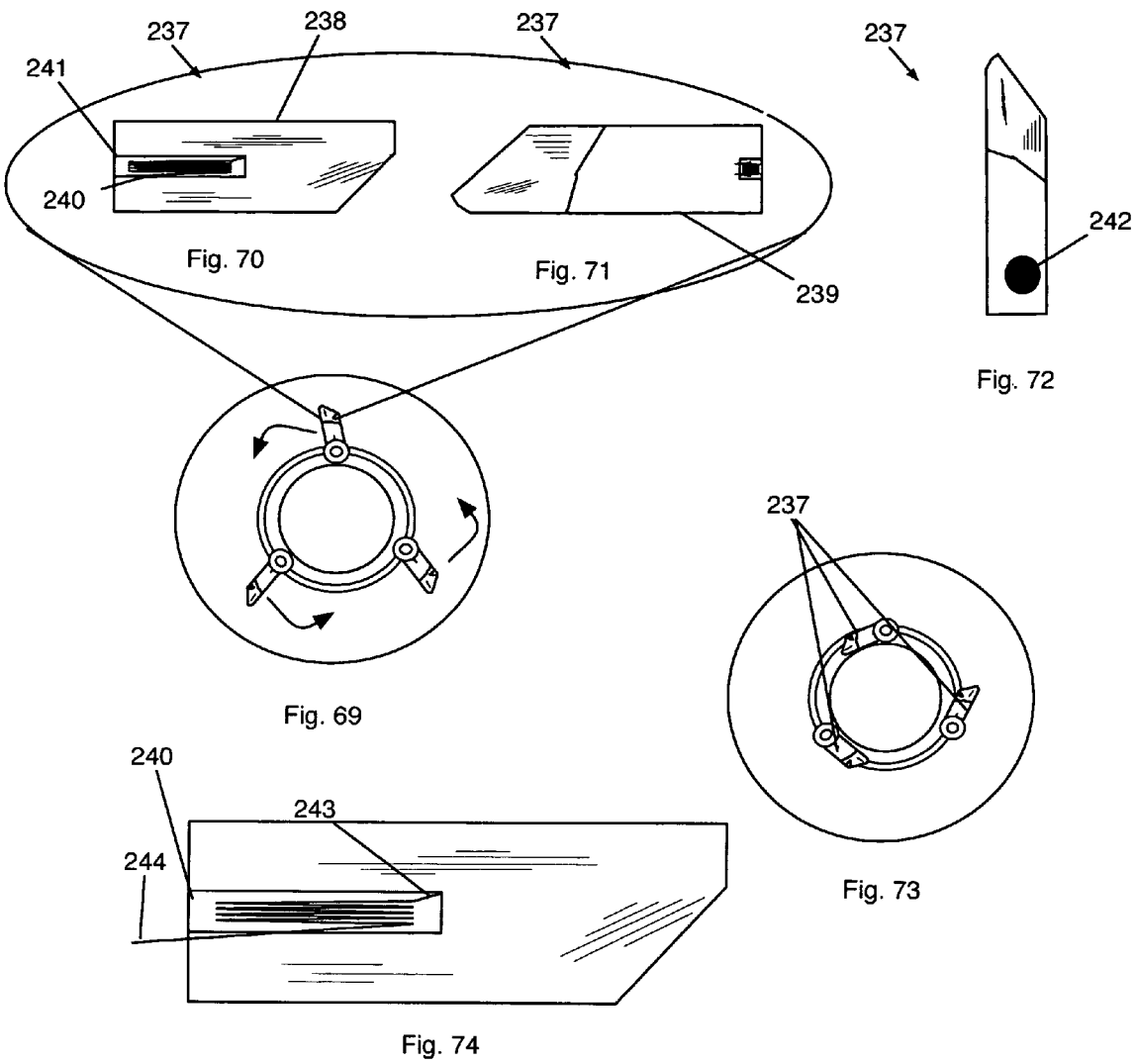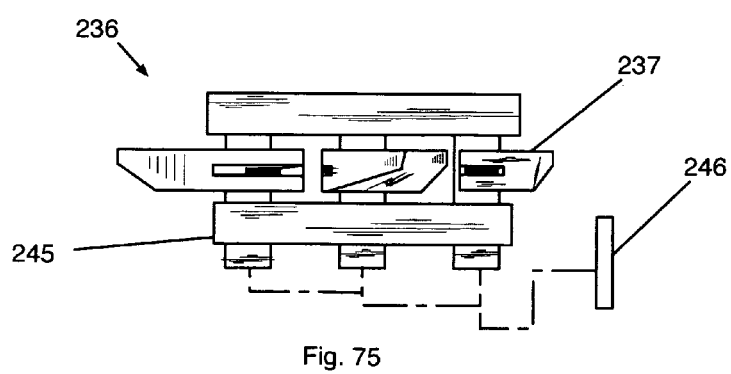

FLUID TRANSFER APPARATUS

FIELD OF THE INVENTION

The present invention is in the area of fluid transfer and more particularly pertains to an apparatus used for the purpose of transferring fluids from one container to another location.

BACKGROUND OF THE INVENTION

In many industrial practices, liquids are stored in airtight containers that can only be accessed through a small round hole. Often these liquids are placed in the containers over a period of time which allows solids to settle from the liquid suspension. The clear liquid needs to be recovered without contamination of the settled solids in a process called racking.

The most common usage of racking is in the wine industry. Newly made wine is aged in wooden barrels. Over time, sediment, or lees, settles to the bottom of the barrels. Winemakers need to remove the clear wine from the lees to process the wine.

A simple instrument for racking is a racking wand. A racking wand is a rigid, hollow tube that is often attached to a rubber hose so that fluid can be siphoned from the container. This method has several disadvantages. The wand must be supported manually so that the tube inlet is above the lees. Suction must be created in the rubber hose (often by mouth suction) which is not only unsanitary, but generally requires another person. Most importantly, as the racking wand is inserted into a small hole in the barrel (called a bung hole), the wine is exposed to the atmosphere, which can oxidize the wine, turning it into vinegar.

U.S. patent 2007/0199,199 to Lake et al. (2007) added magnets to the end of the wand to keep the inlet tube above the lees. However, this device can only work in metallic containers which can hold an adjoining magnet and does not solve the problem of wine oxidation.

Some nonpatented racking wands insert the wand through a plastic corklike device called a bung—which fits snugly into the bung hole. Now the racking wand is suspended above the lees. However, every barrel has a different level of lees, so the racking wand has to be laboriously adjusted within the bung. Additionally, in order to seal the bung snugly into the bung hole, the bung must be pounded in with a hammer. Removal of the bung and racking wand is difficult, and must be hammered out again. If the bung isn't hammered in tightly enough, the racking wand loosens the bung and falls out.

Other nonpatented racking assemblies use gas to displace wine from the barrels. Inert gas, such as nitrogen, prevents wine oxidation. Current gas pressure racking systems still have several disadvantages.

A system manufactured by TCW has an adjustable wand through a bung that pushes wine with an external gas. However, the bung still needs to be hammered into the barrel.

One system (marketed as the Gentle Giant) uses screw tightening mechanism to expand the bung so that is compressed against the bunghole. This method requires a great deal of strength from the operator to get an airtight seal and also is time consuming.

Another system that has been used since 1986 (marketed as the Bulldog Pup) uses a lever lock mechanism to expand the bung into the bung hole. Although less strength is needed to push the levers down and to release them when finished racking, the seal is not airtight and much of the inert gas used to push the wine escapes, which not only is costly, but increases the time needed to rack the wine. Additionally, the lever lock mechanism does not stabilize the wand securely, so that it rotates with the bung as the fulcrum. Therefore, this mechanism requires a person to stabilize the wand manually. The Bulldog pup has attempted to solve the problem of a clear separation of the lees and liquid by adding a brass adjustor with a single bevel compression ferrule to allow vertical lees height adjustment. However, in practice, the wand still tends to slide down into the lees, thus preventing a clean wine racking. Finally, on the occasion when a completely airtight seal is achieved, the bung can still be pushed out of the barrel with high gas pressure. If the system is not watched closely, wine is spilled.

SUMMARY OF THE INVENTION

It is an object of the present invention to provide an apparatus for the purpose of providing a safe, efficient, air-tight bulkhead seal for use with various containers which hold various fluids. In some cases, strong gases may inhere within some containers which may create serious dangers to bystanders and an operator. As such, at least two people are generally needed in order to ensure safety. This seal eliminates the need for another person to hold or retain various objects for the purpose of protecting another person.

It is an object of the present invention to provide an apparatus which makes various fluid transfers safer and more hygienic. The present invention eliminates the need for a person to manually by mouth create a suction on one end of a siphon.

It is another objective of the present invention to prevent or minimize the amount of contact between the fluids within the container and the air outside of the container. In some cases, undesirable chemical processes such as oxidation may chemically alter or destroy various fluids such as wine within a barrel when outside oxygen is allowed into the container.

It is another object of the present invention to minimize the amount of splashing or other turbulence within the container. Many of the prior art devices used for similar purposes create undesirable splashing and other physical disturbances which may create various problems within the container.

It is another object of the present invention to provide a means of ensuring the safety of the operator. In many cases, various containers are internally pressurized which may jettison various plugs or seals which are disposed into the orifices of such containers. The present invention seeks to eliminate such dangers.

It is another object of the present invention to minimize the amount of compressed gas used for the purpose of extracting fluids from the container. Since the operator of the present invention can completely control the gas release from the container, less compressed gas is necessary. As a result, the resulting decrease in the amount of gas used redounds to the benefit of the operator through cost savings.

It is another object of the present invention to maximize the amount of clear fluid recovery from a container. In the wine industry, various sediment is found near the bottom of the container. Generally speaking, this sediment may be undesirable for the operator. As such, the present invention seeks to minimize the amount of sediment uptake through various racking wands which may be used in conjunction with the present invention.

BRIEF DESCRIPTION OF THE DRAWING FIGURES

FIG. 13 is a side view of a preferred embodiment of the present invention.

FIG. 14 is a side view of a preferred embodiment of the present invention.

FIG. 15 is a plan view of a preferred embodiment of the present invention.

FIG. 16 is a plan view of a preferred embodiment of the present invention.

FIG. 17 is a plan view of a preferred embodiment of the present invention.

FIG. 18 is a plan view of a preferred embodiment of the present invention.

FIG. 19 is a side view of a preferred embodiment of the present invention.

FIG. 20 is a side view of a preferred embodiment of the present invention.

FIG. 21 is a side view of a preferred embodiment of the present invention.

FIG. 22 is a plan view of a preferred embodiment of the present invention.

FIG. 23 is a plan view of a preferred embodiment of the present invention.

FIG. 24 is a plan view of a preferred embodiment of the present invention.

FIG. 25 is a plan view of a preferred embodiment of the present invention.

FIG. 26 is a side view of a preferred embodiment of the present invention.

FIG. 27 is a side view of a preferred embodiment of the present invention.

FIG. 28 is a side view of a preferred embodiment of the present invention.

FIG. 29 is a plan view of a preferred embodiment of the present invention.

FIG. 30 is a plan view of a preferred embodiment of the present invention.

FIG. 31 is a side view of a preferred embodiment of the present invention.

FIG. 32 is a plan view of a preferred embodiment of the present invention.

FIG. 33 is a frontal view of a preferred embodiment of the present invention.

FIG. 55 is a side view of a preferred embodiment of the present invention.

FIG. 56 is a side view of a preferred embodiment of the present invention.

FIG. 57 is a plan view of a preferred embodiment of the present invention.

FIG. 58 is a plan view of a preferred embodiment of the present invention.

FIG. 59 is a plan view of a preferred embodiment of the present invention.

FIG. 60 is a plan view of a preferred embodiment of the present invention.

FIG. 61 is a side view of a preferred embodiment of the present invention.

FIG. 62 is a side view of a preferred embodiment of the present invention.

FIG. 63 is a side view of a preferred embodiment of the present invention.

FIG. 64 is a plan view of a preferred embodiment of the present invention.

FIG. 65 is a plan view of a preferred embodiment of the present invention.

FIG. 66 is a plan view of a preferred embodiment of the present invention.

FIG. 67 is a plan view of a preferred embodiment of the present invention.

FIG. 68 is a side view of a preferred embodiment of the present invention.

FIG. 69 is a plan view of a preferred embodiment of the present invention.

FIG. 70 is a side view of a preferred embodiment of the present invention.

FIG. 71 is a side view of a preferred embodiment of the present invention.

FIG. 72 is a plan view of a preferred embodiment of the present invention.

FIG. 73 is a plan view of a preferred embodiment of the present invention.

FIG. 74 is a side view of a preferred embodiment of the present invention.

FIG. 75 is a frontal view of a preferred embodiment of the present invention.

DESCRIPTION OF PREFERRED EMBODIMENTS

According to a preferred embodiment of the present invention, a unique apparatus is used to improve the transfer of various fluids from a sealed container to another location. Although one specific application of the present invention is the transfer, sampling, etc. of various alcoholic substances such as wine, beer, and similar substances, the present invention may be applied to other applications with equal effectiveness.

The present invention may be adapted for use with various toxic fluids, non-alcoholic beverages, and the like. Moreover, it may be possible to apply the present invention for use with gases as well as liquids. For these reasons, the present invention is not meant to be construed to be narrowed in scope to the alcoholic beverage industry. The present invention is described in enabling detail below.

Figure 1A:
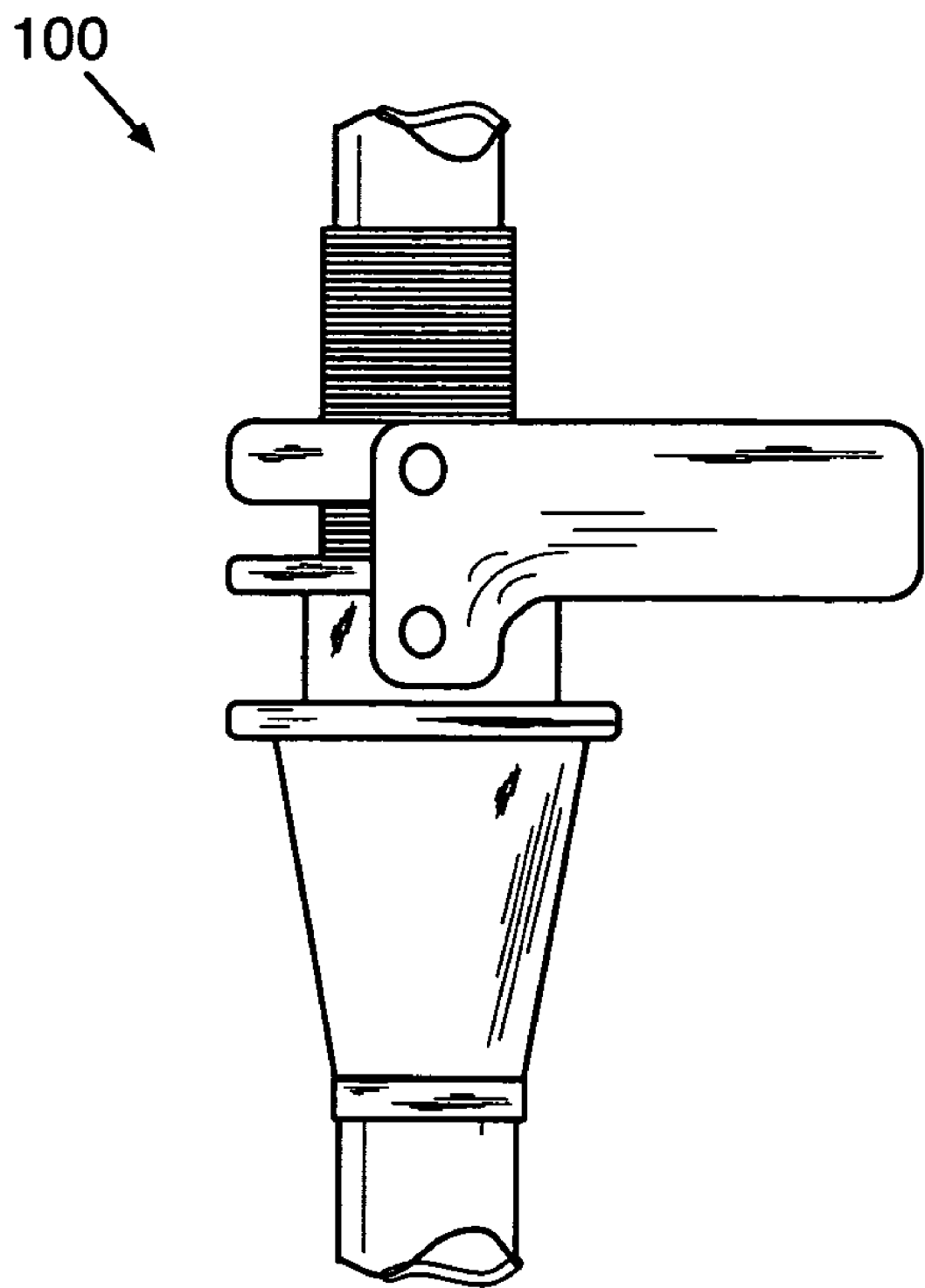
FIG. 1A is a side view of a preferred embodiment of the present invention.
Figure 1B:
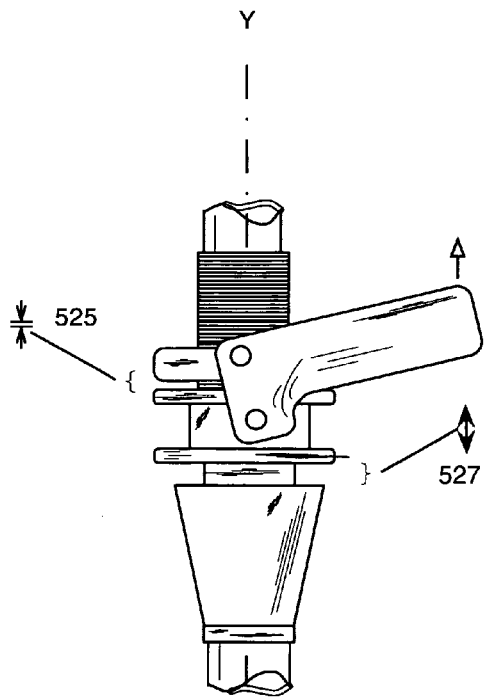
FIG. 1B is a side view of a preferred embodiment of the present invention.
Figure 1C:
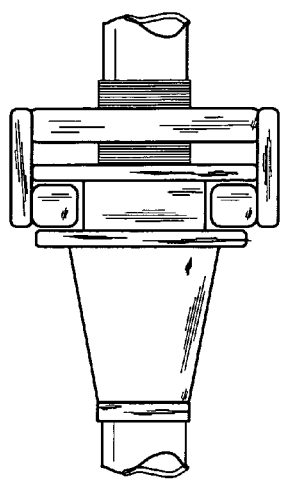
FIG. 1C is a rear view of a preferred embodiment of the present invention.
Figure 1D:
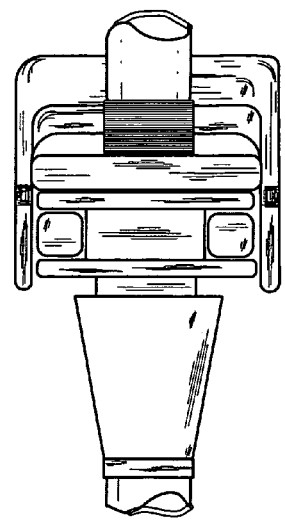
FIG. 1D is a rear view of a preferred embodiment of the present invention.
Figure 1E:
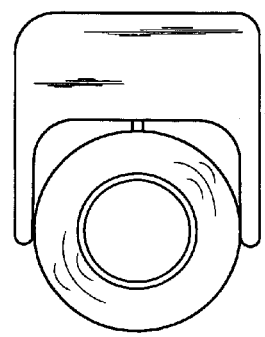
FIG. 1E is a plan view of a preferred embodiment of the present invention.
Figure 1F:
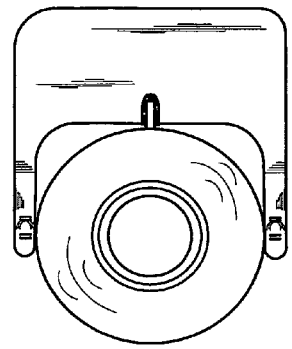
FIG. 1F is a plan view of a preferred embodiment of the present invention.
Figure 1G:
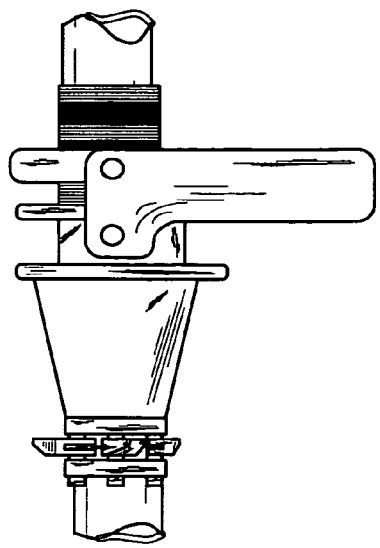
FIG. 1G is a side view of a preferred embodiment of the present invention.
Figure 1H:
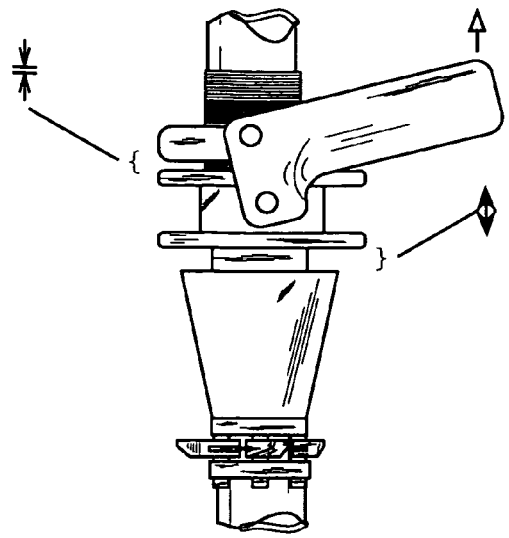
FIG. 1H is a side view of a preferred embodiment of the present invention.
Figure 1I:
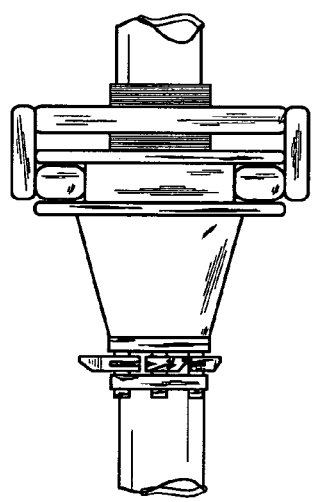
FIG. 1I is a rear view of a preferred embodiment of the present invention.
Figure 1J:
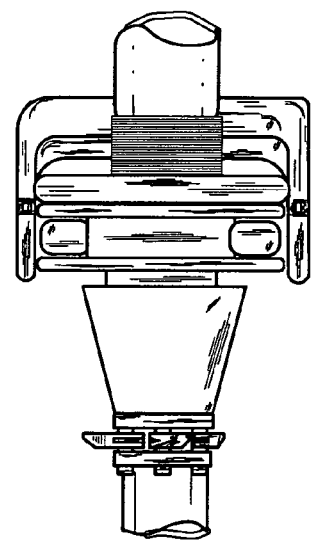
FIG. 1J is a rear view of a preferred embodiment of the present invention.
Figure 1K:
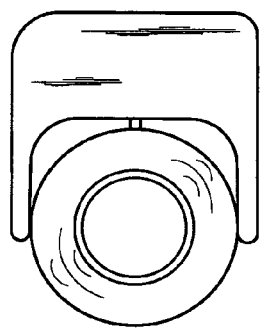
FIG. 1K is a plan view of a preferred embodiment of the present invention.
Figure 1L:
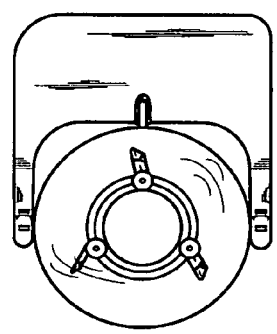
FIG. 1L is a plan view of a preferred embodiment of the present invention.
Figure 1M:
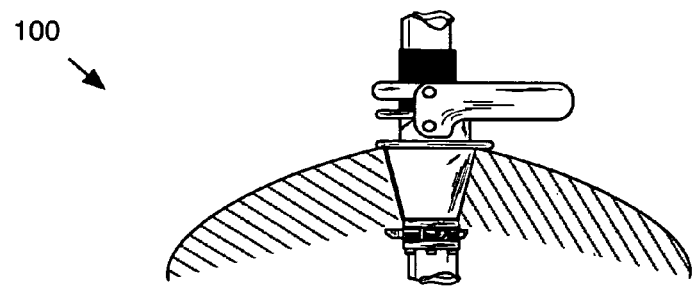
FIG. 1M is a side view of a preferred embodiment of the present invention.
Figure 1N:
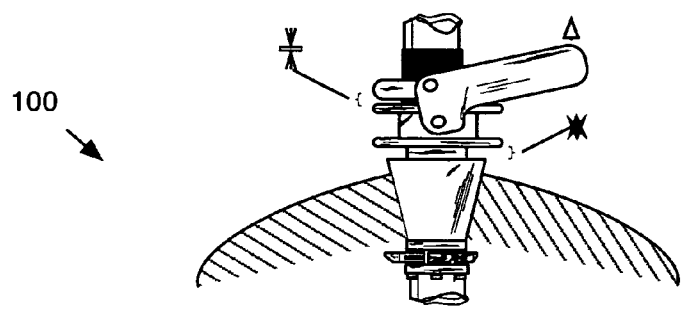
FIG. 1N is a side view of a preferred embodiment of the present invention.
Figure 1O:
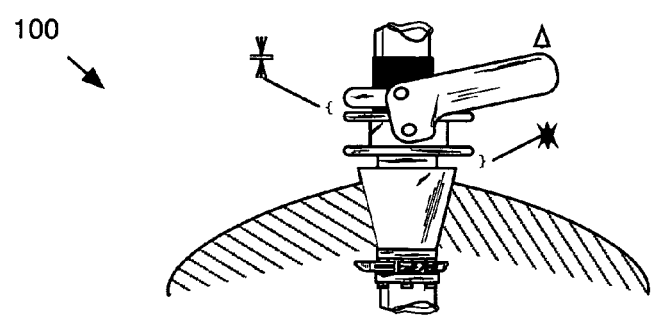
FIG. 1O is a side view of a preferred embodiment of the present invention.
Figure 1P:
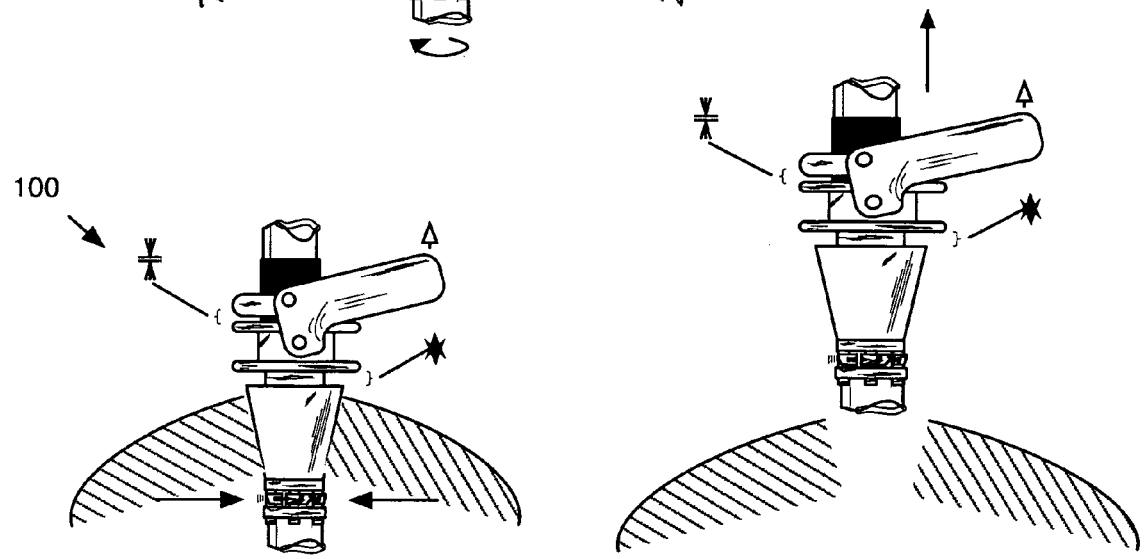
FIG. 1P is a side view of a preferred embodiment of the present invention.
Figure 1Q:
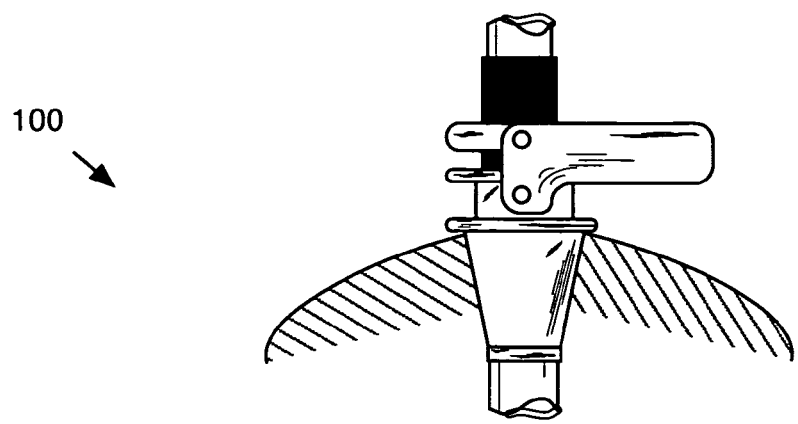
FIG. 1Q is a side view of a preferred embodiment of the present invention.
Figure 1R:
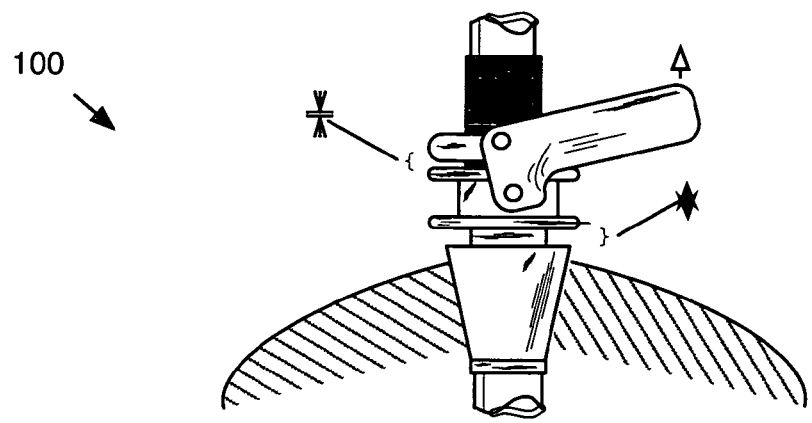
FIG. 1R is a side view of a preferred embodiment of the present invention.
Figure 1S:
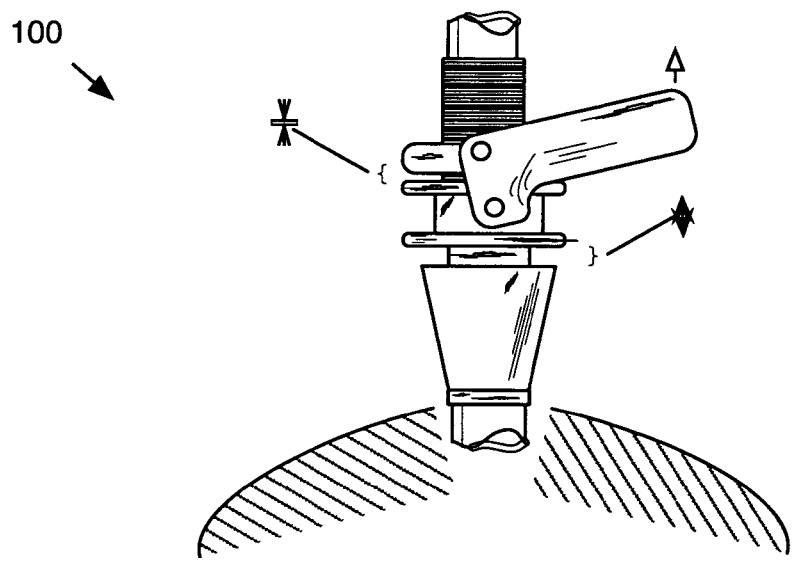
FIG. 1S is a side view of a preferred embodiment of the present invention.
Figure 2:
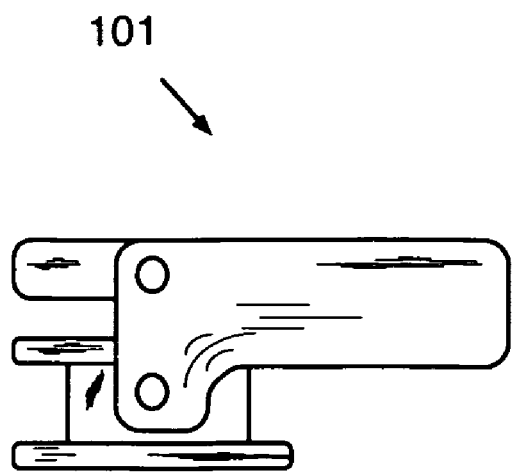
FIG. 2 is a side view of a preferred embodiment of the present invention.
Figure 3:
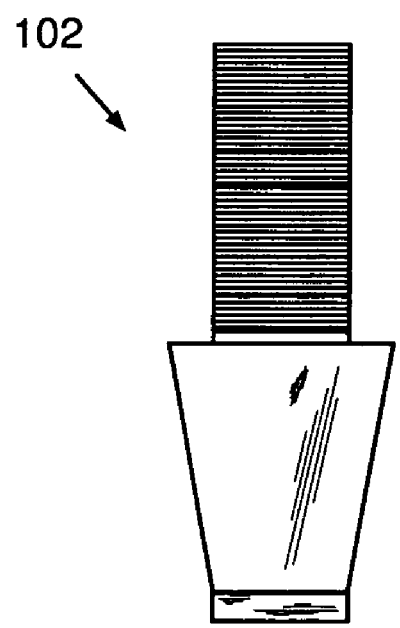
FIG. 3 is a side view of a preferred embodiment of the present invention.
Figure 4:
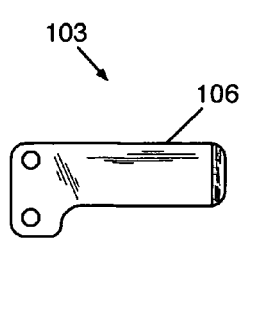
FIG. 4 is a side view of a preferred embodiment of the present invention.
Figure 5:
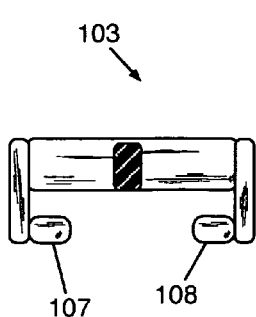
FIG. 5 is a rear view of a preferred embodiment of the present invention.
Figure 6:
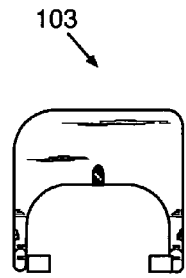
FIG. 6 is a plan view of a preferred embodiment of the present invention.
Figure 7:
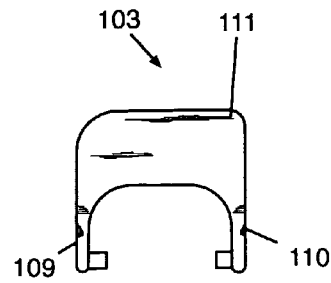
FIG. 7 is a plan view of a preferred embodiment of the present invention.
Figure 8:
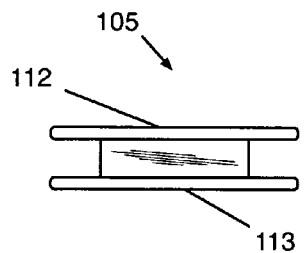
FIG. 8 is a side view of a preferred embodiment of the present invention.
Figure 9:
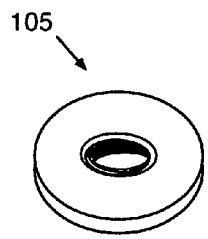
FIG. 9 is a perspective view of a preferred embodiment of the present invention.
Figure 10:
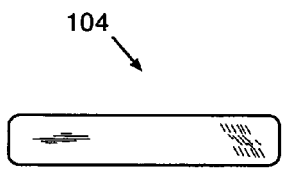
FIG. 10 is a side view of a preferred embodiment of the present invention.
Figure 11:
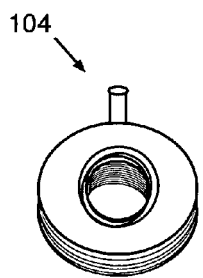
FIG. 11 is a perspective view of a preferred embodiment of the present invention.
Figure 12:
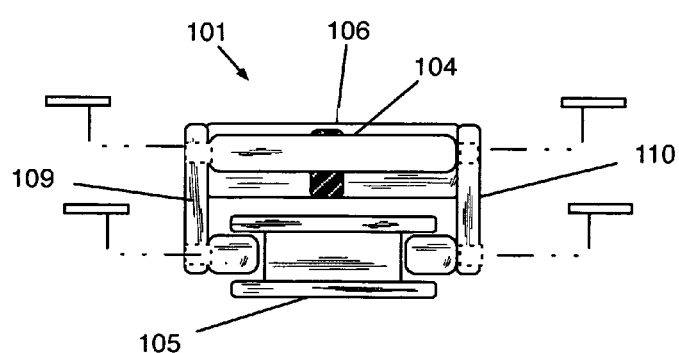
FIG. 12 is a frontal view of a preferred embodiment of the present invention.

FIGS. 1-3 illustrates a preferred embodiment of the present invention. A fluid transfer apparatus 100 includes a cam locking assembly 101 and a cooperating seal member apparatus 102. The cam locking assembly is in communication with the cooperating seal member apparatus. The cam lock assembly is affixed or connected with the cooperating seal member apparatus through complementary threading in some preferred embodiments. In other preferred embodiments, the means of connection may be a simple interference fit, whereas in others the means of connection may be through detents. A skilled artisan will appreciate numerous other means of connection as well.

FIGS. 4-12 illustrates that the cam locking assembly is comprised of a lock handle assembly 103, a handle ring 104, and a press ring 105. The lock handle assembly is comprised of a U-shaped member 106 and at least two pivot rollers 107, 108.

The U-shaped member is comprised of a first side 109, a second side 110, and a third side 111. The pivot rollers are disposed at the first and second sides of the U-shaped member respectively. The handle ring is a member with an orifice disposed therethrough. The handle ring is pivotally connected with the lock handle assembly at the first side and the second side of the U-shaped member.

The press ring is a cylindrical member with an upper flange 112 and a lower flange 113. The pivot rollers are disposed between the upper flange and the lower flange of the press ring. Enough space is provided between the upper and lower flanges in order to enable the pivot rollers to freely rotate and thereby allow the press ring to be translated along the vertical axis of the fluid transfer apparatus.

FIG. 1b illustrates the vertical translation of the press ring along the vertical axis Y. In the open position gap 1 525 appears between handle ring and press ring. Gap 2 527 is also created as the press ring is removed from the cooperating seal apparatus. This vertical translation is the principal movement which creates the seal. More specifically, the primary seal is found at the interface of the press ring and the cooperating seal member apparatus 102.

In operation, FIGS. 1M-1S illustrated how the invention is to be used in typical applications. The fluid transfer apparatus 100 is inserted into a hole or orifice to which it will create a bulkhead seal. In order to create the seal the U-Shaped member is pushed in a downwards direction. This seal prevents the escape of gases or liquids from the container. The fluid transfer apparatus is removed from the container by pulling upwards on the U-shaped member which, in turn releases the press ring from the orifice to which it is applied.

FIGS. 13-26 illustrates that in some preferred embodiments, the cooperating seal member apparatus is comprised of an elongate cylindrical member 114 and a seal 115. The elongate cylindrical member is sized to mate with the seal. The elongate cylindrical member is comprised of a top side 116 and a seal flange 117. In some preferred embodiments a portion of the elongate cylindrical member is complementarily threaded with the press ring and the handle ring of the cam locking assembly 101.

FIGS. 19 and 26 illustrate that the seal abuts the seal flange of the elongate cylindrical member. The top side of the cooperating seal member apparatus is sized to mate with the press ring and the handle ring of the cam locking assembly. In some preferred embodiments the seal may take the shape of a frustoconical cylinder.

FIGS. 27-33 illustrate that in some preferred embodiments the fluid transfer apparatus may also include an engaging seal assembly 136. The engaging seal assembly is comprised of a plurality of engaging fingers 137. The engaging fingers are pivotally connected with the seal flange of the cooperating seal member apparatus. FIG. 33 also illustrates that the engaging seal assembly further comprises a finger flange 145, and a plurality of finger dowels 146.

The engaging fingers comprise a first side 138, a second side 139, a spring 140, a spring channel 141, and an engaging orifice 142. The engaging orifice is disposed longitudinally between the first side and the second side. The spring 140 has a first distal end 143 and a second distal end 144. The first distal end abuts the spring channel 141.

FIGS. 30 and 32 illustrate the principal mechanism of the engaging seal assembly. In an open configuration as illustrated in FIG. 32, the engaging fingers are oriented towards the center of the axis. In the closed or locked configuration, the engaging fingers radiate away from the center axis which prevents the fluid transfer apparatus 100 from releasing from the object to which it is affixed. It should be noted here that in some preferred embodiments the engaging seal assembly is optional as illustrated in numerous figures.

It should be noted here that there abound a panoply of different ways or means of affixing the engaging seal assembly 136 to the fluid transfer apparatus 100. In particular, the engaging fingers 137 may be pivotally affixed to the fluid transfer apparatus 100 in ways or through means discernable to one skilled in the art. For these reasons, the scope of the present invention is not meant to be construed to be limiting as to the method or means of affixing the engaging seal assembly 136 to the fluid transfer apparatus 100.

In addition, FIGS. 1M-1P illustrate how the engaging seal assembly 136 works in operation. FIG. 1O illustrates that the U-shaped member of the fluid transfer apparatus is turned counterclockwise. In turn, the engaging fingers 137 retracts inwards which enables the fluid transfer apparatus to be removed from the container as illustrated in FIG. 1P.

Figure 34:
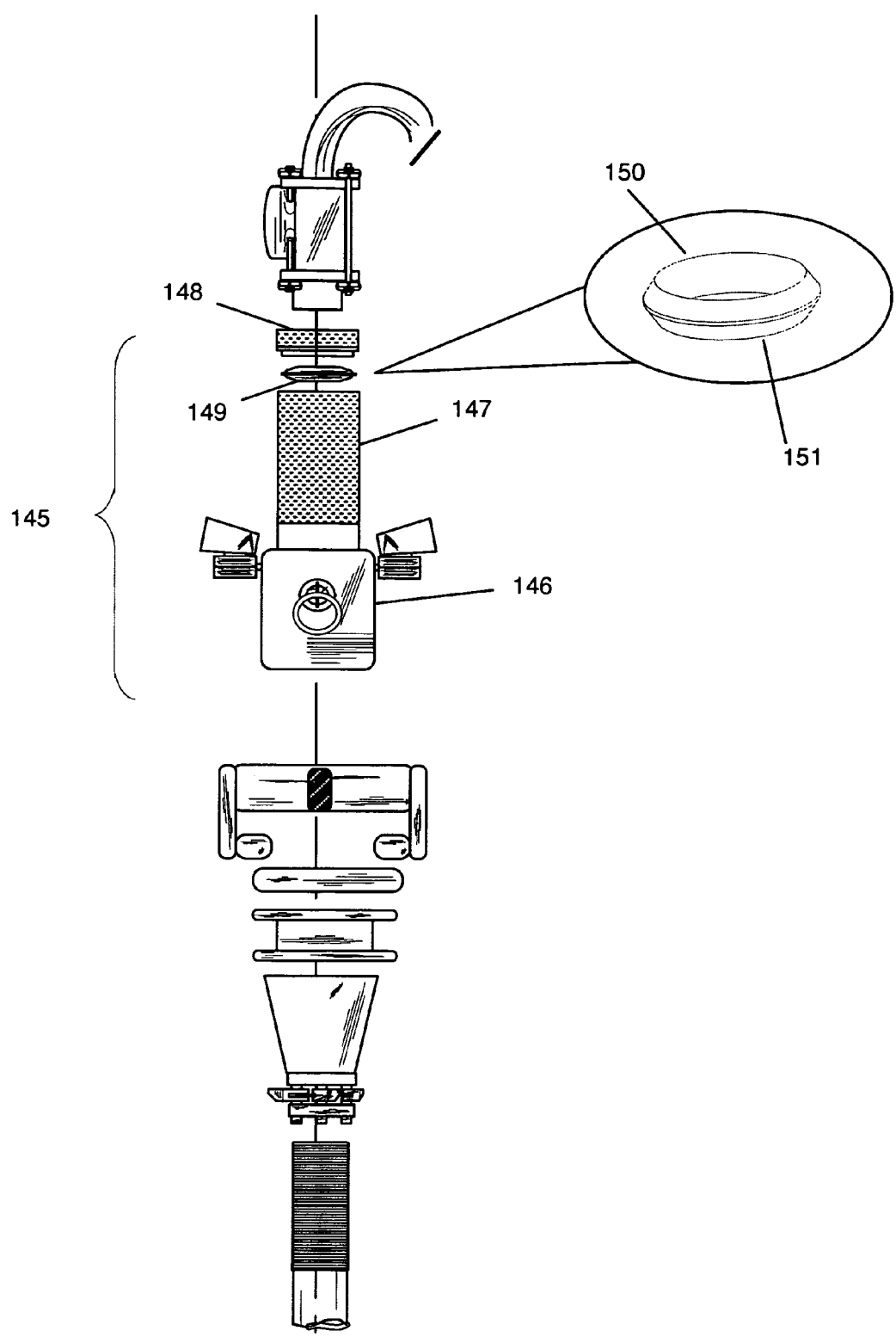
FIG. 34 is a frontal view of a preferred embodiment of the present invention.
Figure 35:
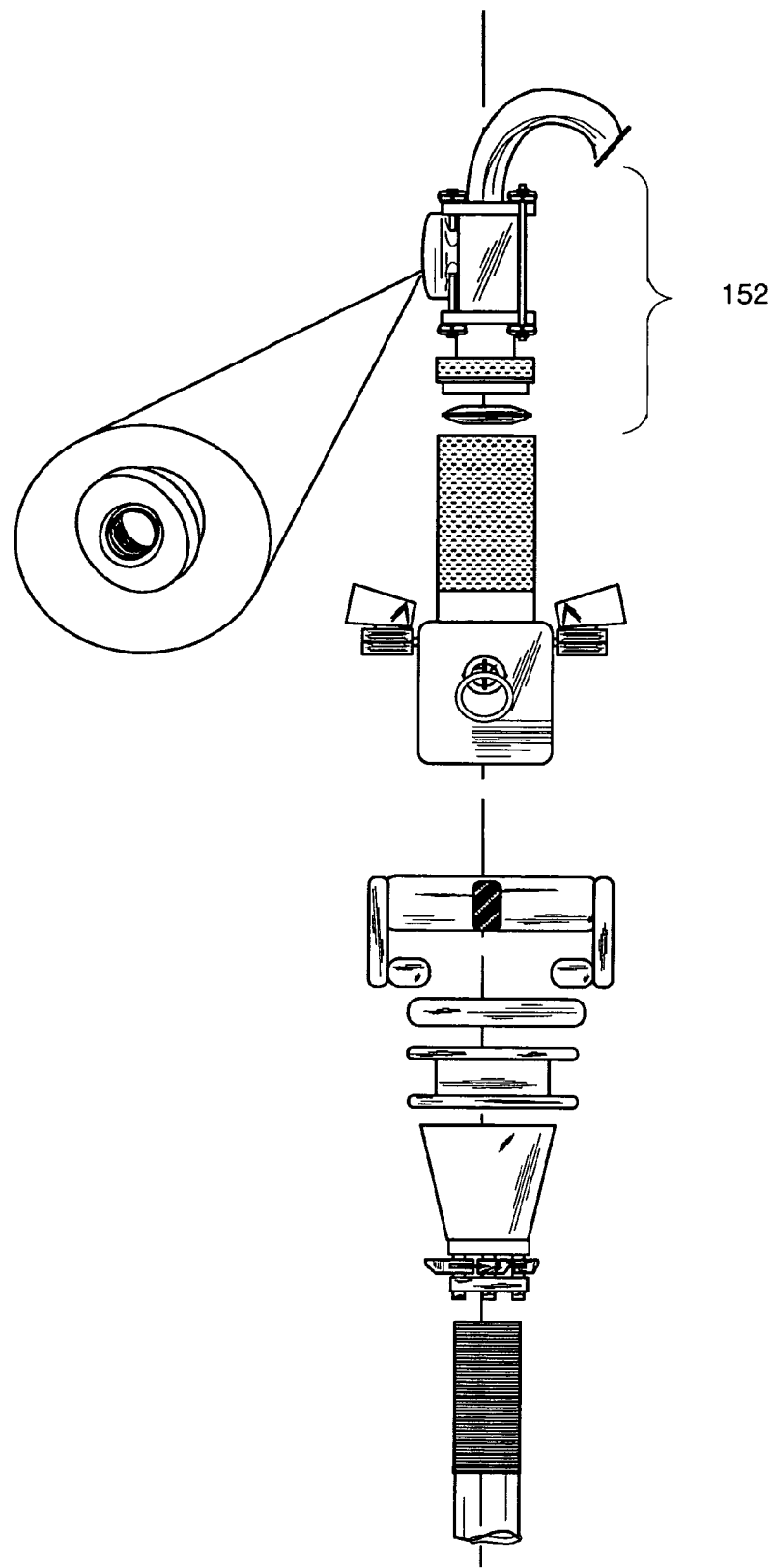
FIG. 35 is a frontal view of a preferred embodiment of the present invention.
Figure 36:
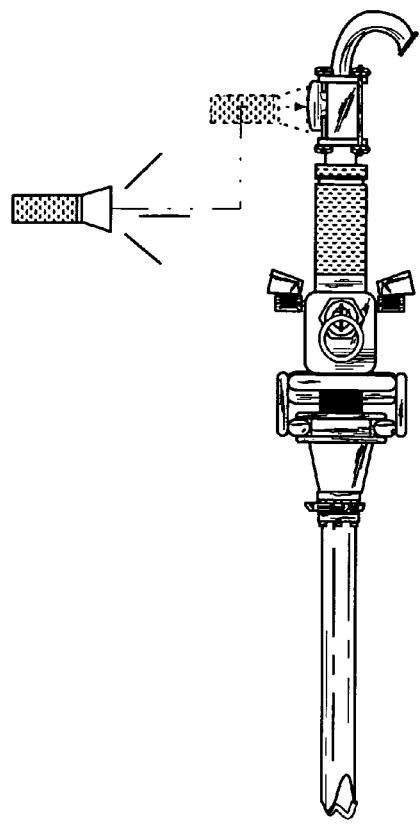
FIG. 36 is a frontal view of a preferred embodiment of the present invention.
Figure 37:
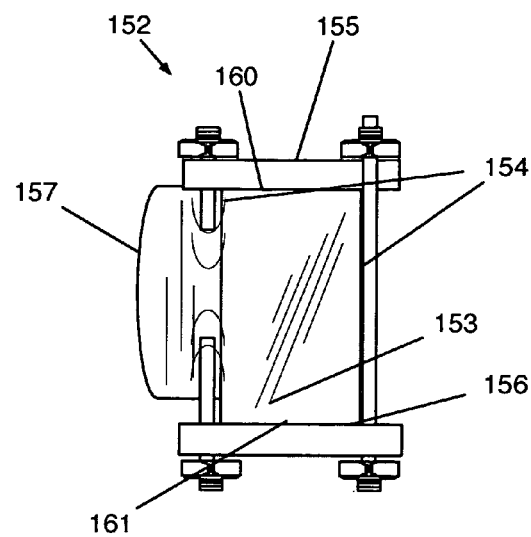
FIG. 37 is a side view of a preferred embodiment of the present invention.
Figure 38:
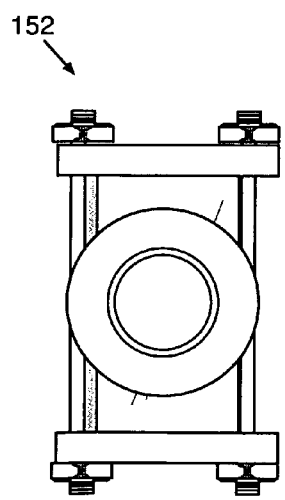
FIG. 38 is a frontal view of a preferred embodiment of the present invention.
Figure 39:
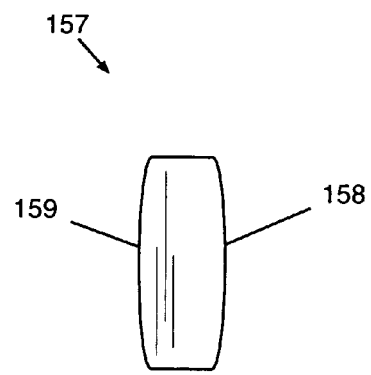
FIG. 39 is a plan view of a preferred embodiment of the present invention.

FIG. 34 illustrates that in some preferred embodiments the invention may further include a body assembly 145. The body assembly is comprised of a lower cylinder 146, an upper cylinder 147 and a lock ring 148. The lower cylinder is sized to mate with the upper cylinder and the cooperating seal member apparatus. The upper cylinder is sized to mate with the lock ring.

FIG. 34 also illustrates that in some preferred embodiments the fluid transfer apparatus may also include a compression ferrule 149. The compression ferrule is disposed between the lock ring and the upper cylinder. The compression ring is comprised of an anterior edge 150 and a posterior edge 151.

FIGS. 35-39 illustrates that in some preferred embodiments the fluid transfer apparatus may further incorporate an inspection assembly apparatus 152. The inspection assembly apparatus is comprised of a transparent tube 153, a plurality of dowels 154, an anterior flange 155, a posterior flange 156 and a retainer 157. The retainer is a ring shaped member comprised of an inner surface 158 and an outer surface 159. The outer surface of the retainer is sized to mate with a light producing apparatus such as a flashlight.

The transparent tube is comprised of a first end 160 and a second end 161. The dowels are disposed around the transparent tube The retainer is affixed to at least two dowels at the inner surface of the retainer.

Figure 40:
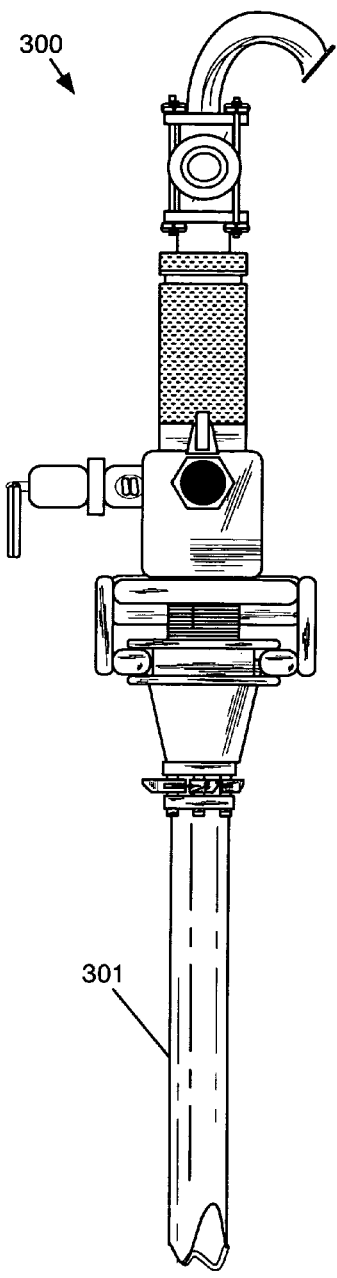
FIG. 40 is a frontal view of a preferred embodiment of the present invention.
Figure 41:
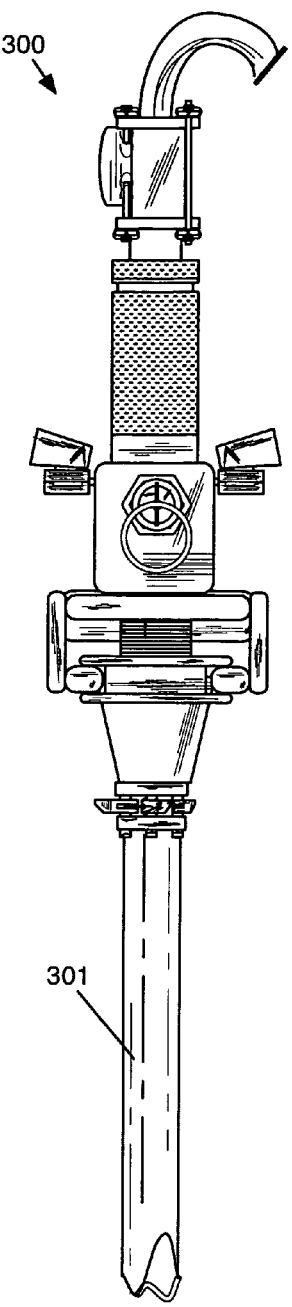
FIG. 41 is a frontal view of a preferred embodiment of the present invention.
Figure 42:
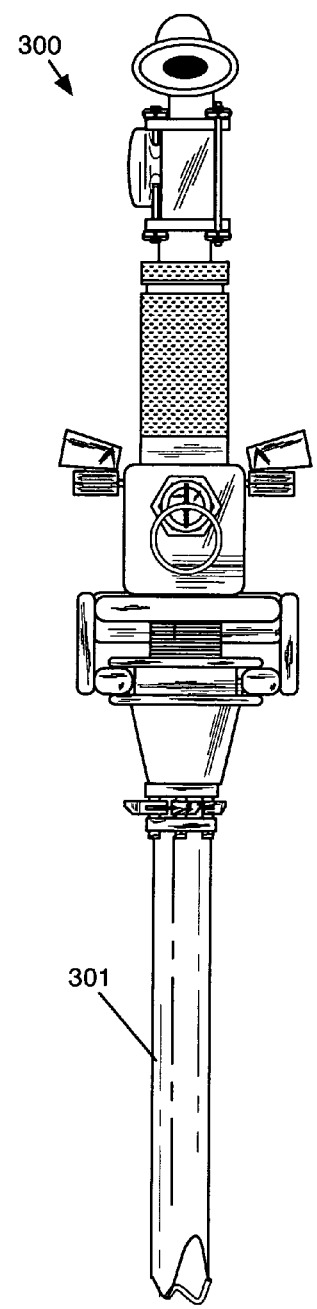
FIG. 42 is a frontal view of a preferred embodiment of the present invention.

FIGS. 40-42 illustrate a pressurized racking apparatus 200 for use with various fermenting processes which include, but are not limited to: wine, beer, and related alcoholic beverages. The pressurized racking apparatus includes a cam sealing assembly 201 and a cooperating seal 202. The cam sealing assembly is in communication with the cooperating seal. The cam sealing assembly is affixed or connected with the cooperating seal through complementary threading in some preferred embodiments. In other preferred embodiments, the means of connection may be a simple interference fit, whereas in others the means of connection may be through detents. A skilled artisan will appreciate numerous other means of connection as well.

FIGS. 47-54 illustrates that the cam sealing assembly 201 is comprised of a puller assembly 203, a first press 204, and a second press 205. The puller assembly 203 is comprised of a handle member 206 and at least two rollers 207, 208.

The handle member 206 is comprised of a first plane 209, a second plane 210, and a third plane 211. The rollers are disposed at the first and second planes of the handle member 206 respectively. The first press 204 is a member with an orifice disposed therethrough. The first press 204 is pivotally connected with the puller assembly 203 at the first side and the second side of the handle member 206.

The second press 205 is a cylindrical member with a top flange 212 and a bottom flange 213. The rollers are disposed between the top flange 212 and the bottom flange 213 of the second press 205. Enough space is provided between the top and bottom flanges in order to enable the rollers to freely rotate and thereby allow the second press 205 to be translated along the vertical axis of the pressurized racking apparatus 200. This vertical translation is the principal movement which creates the seal. More specifically, the primary seal is found at the interface of the first press 204 and the cooperating seal 202.

FIGS. 55-68 illustrates that in some preferred embodiments, the cooperating seal 202 is comprised of a cylindrical member 214 and a resilient member 215. The cylindrical member 214 is sized to mate with the resilient member 215. The cylindrical member 214 is comprised of a primary side 216 and a flange 218. In some preferred embodiments a portion of the cylindrical member 214 is complementarily threaded with the second press 205 and the first press 204 of the cam sealing assembly 201.

FIGS. 61 and 68 illustrate that the resilient member 215 abuts the flange. The outer circumference of the cooperating seal 202 is sized to mate with the first press 204 and the second press 205 of the puller assembly 203. In some preferred embodiments the resilient member 215 may take the shape of a frustoconical cylinder.

Figure 43:
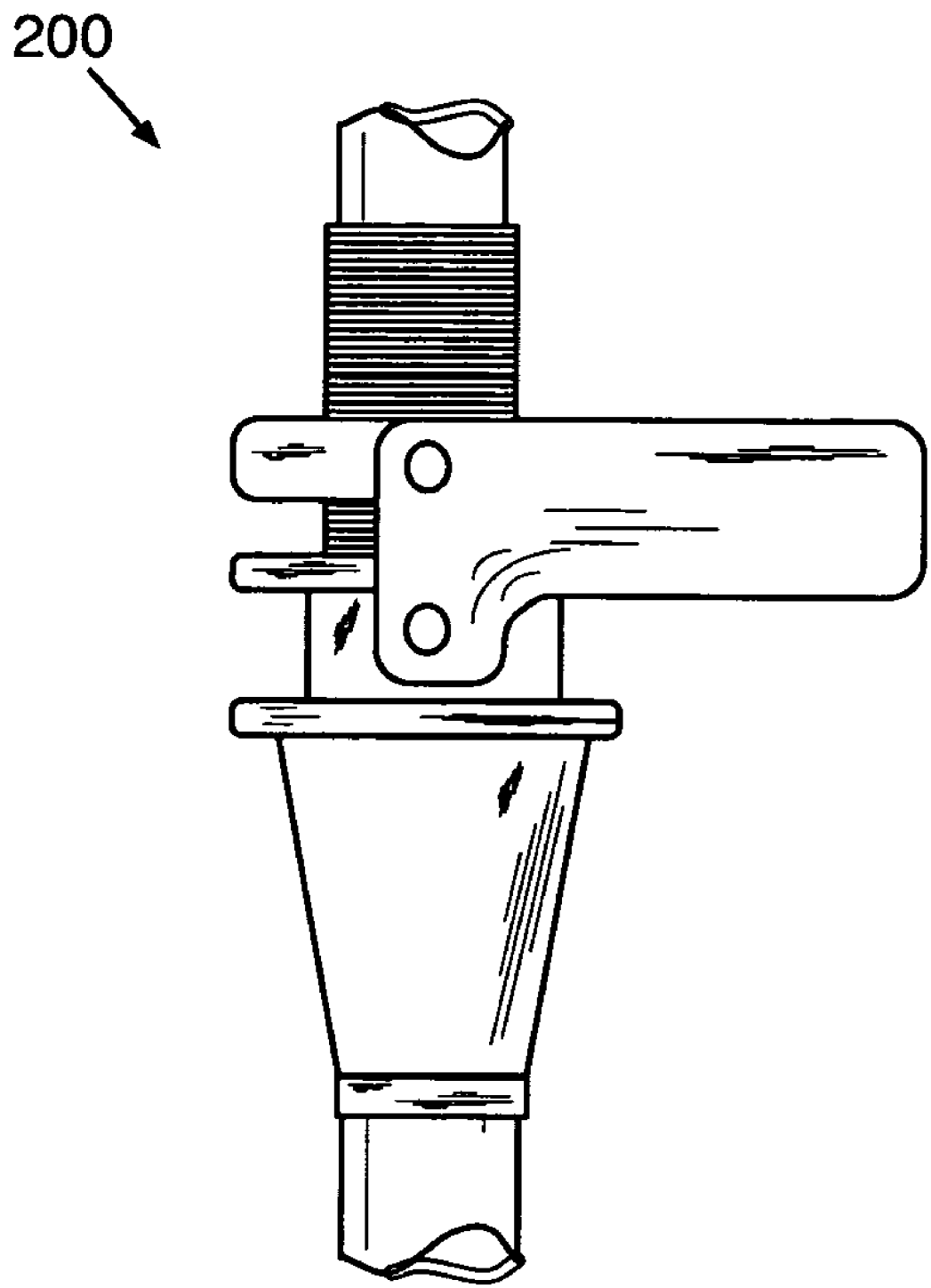
FIG. 43A is a side view of a preferred embodiment of the present invention.
FIG. 43B is a side view of a preferred embodiment of the present invention.
FIG. 43C is a rear view of a preferred embodiment of the present invention.
FIG. 43D is a rear view of a preferred embodiment of the present invention.
FIG. 43E is a plan view of a preferred embodiment of the present invention.
FIG. 43F is a plan view of a preferred embodiment of the present invention.
FIG. 43G is a side view of a preferred embodiment of the present invention.
FIG. 43H is a side view of a preferred embodiment of the present invention.
FIG. 43I is a rear view of a preferred embodiment of the present invention.
FIG. 43J is a rear view of a preferred embodiment of the present invention.
FIG. 43K is a plan view of a preferred embodiment of the present invention.
FIG. 43L is a plan view of a preferred embodiment of the present invention.
FIG. 43M is a side view of a preferred embodiment of the present invention.
FIG. 43N is a side view of a preferred embodiment of the present invention.
FIG. 43O is a side view of a preferred embodiment of the present invention.
FIG. 43P is a side view of a preferred embodiment of the present invention.
FIG. 43Q is a side view of a preferred embodiment of the present invention.
FIG. 43R is a side view of a preferred embodiment of the present invention.
FIG. 43S is a side view of a preferred embodiment of the present invention.
Figure 43B:
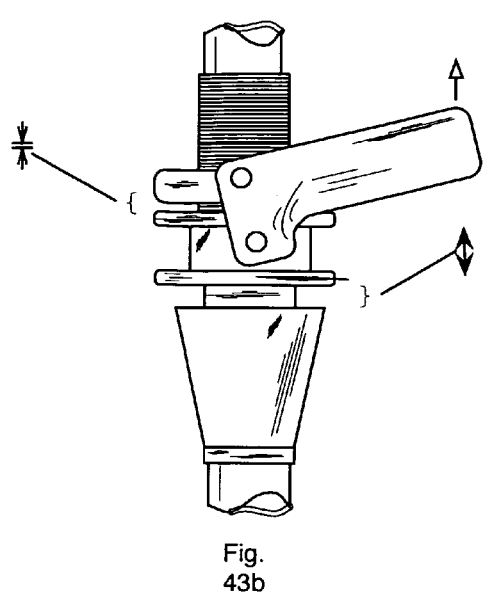
Figure 43C:
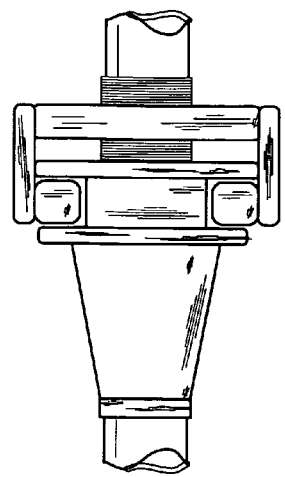
Figure 43D:
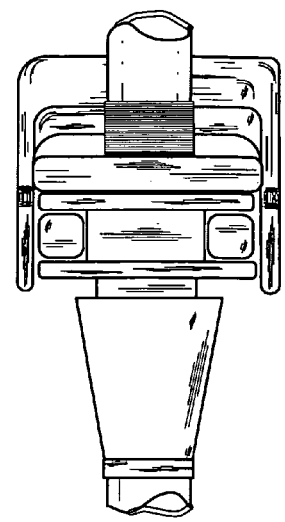
Figure 43E:
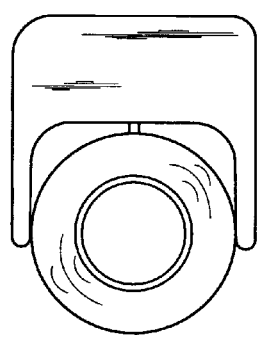
Figure 43F:
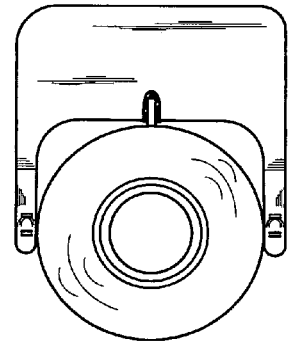
Figure 43G:
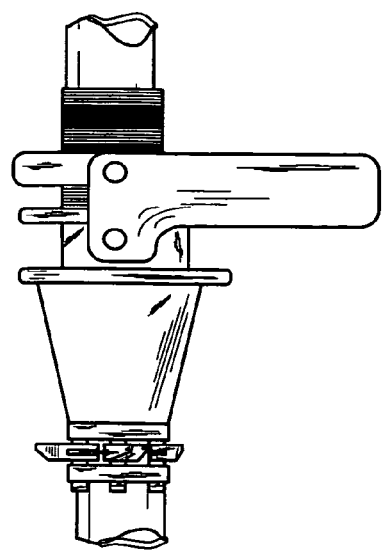
Figure 43H:
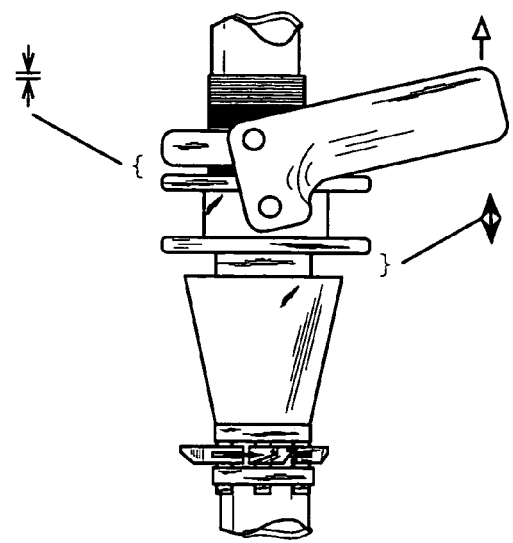
Figure 43I:
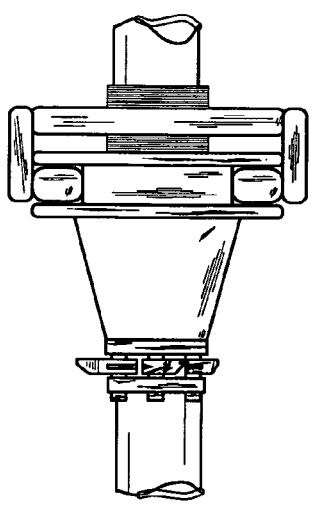
Figure 43J:
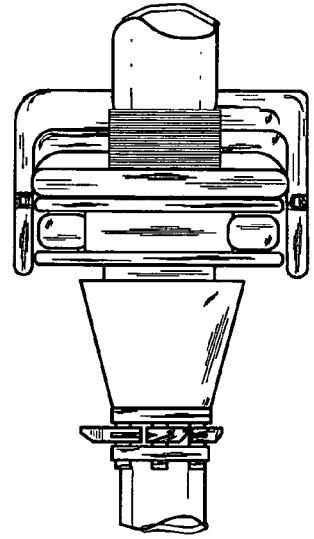
Figure 43K:
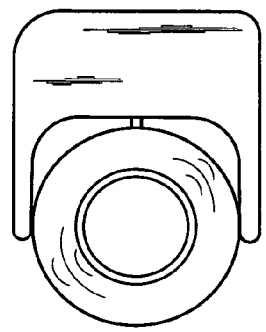
Figure 43L:
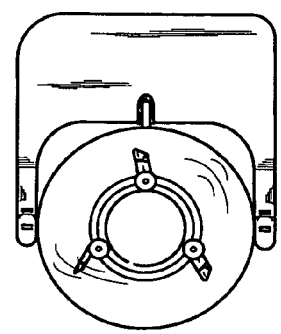
Figure 43Q:
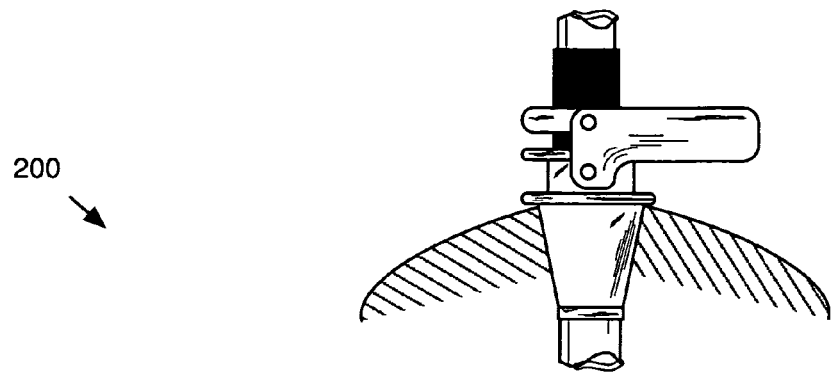
Figure 43R:
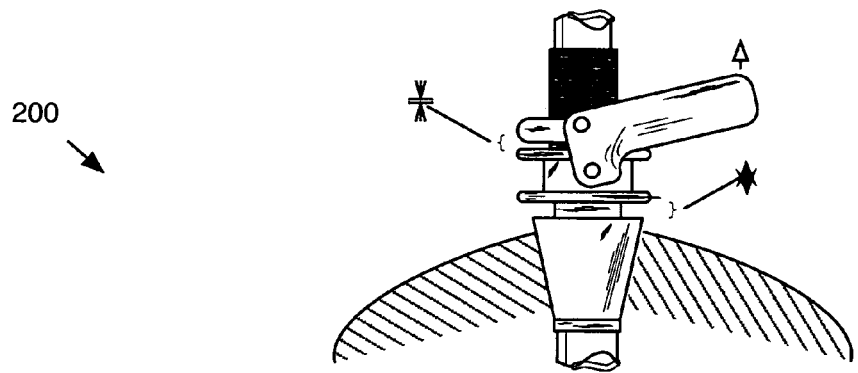
Figure 43S:
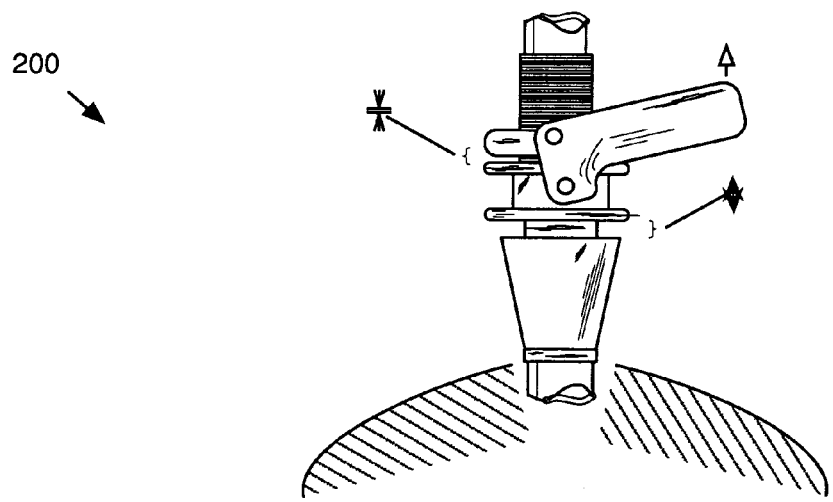
Figure 44:
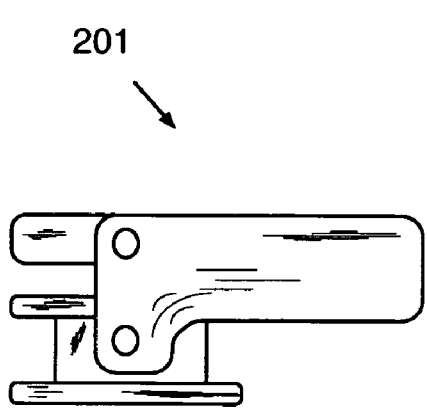
FIG. 44 is a side view of a preferred embodiment of the present invention.
Figure 45:
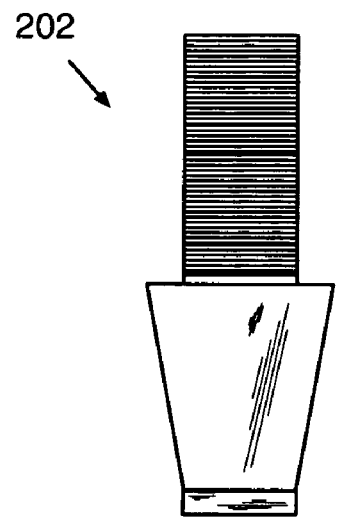
FIG. 45 is a side view of a preferred embodiment of the present invention.
Figure 46:
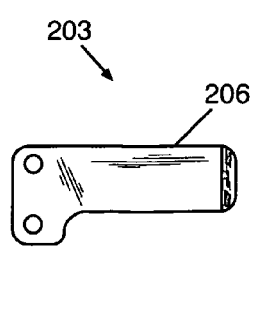
FIG. 46 is a side view of a preferred embodiment of the present invention.
Figure 47:
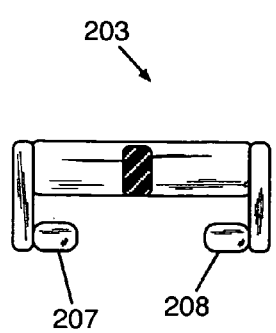
FIG. 47 is a side view of a preferred embodiment of the present invention.
Figure 48:
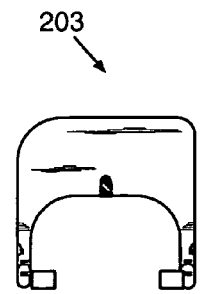
FIG. 48 is a rear view of a preferred embodiment of the present invention.
Figure 49:
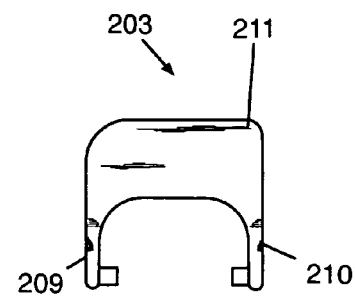
FIG. 49 is a plan view of a preferred embodiment of the present invention.
Figure 50:
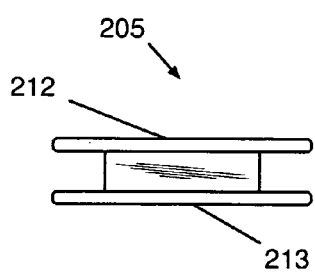
FIG. 50 is a plan view of a preferred embodiment of the present invention.
Figure 51:
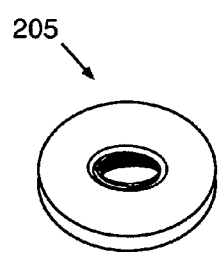
FIG. 51 is a side view of a preferred embodiment of the present invention.
Figure 52:
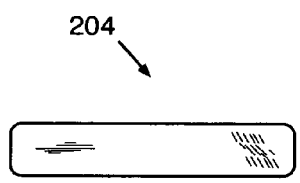
FIG. 52 is a perspective view of a preferred embodiment of the present invention.
Figure 53:
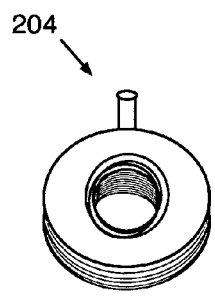
FIG. 53 is a side view of a preferred embodiment of the present invention.
Figure 54:
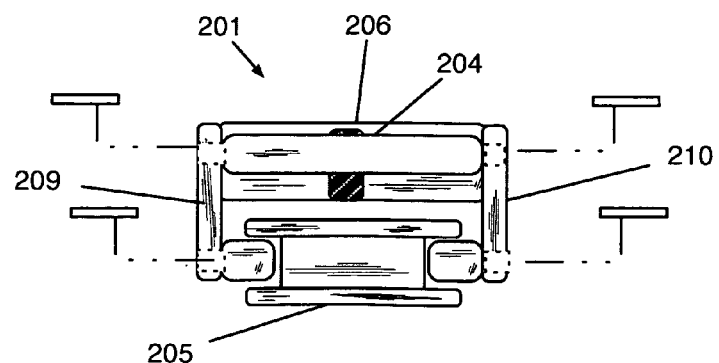
FIG. 54 is a perspective view of a preferred embodiment of the present invention.

In operation, FIGS. 43M-1S illustrated how the invention is to be used in typical applications. The pressurized racking apparatus 200 is inserted into a hole or orifice to which it will create a bulkhead seal. In order to create the seal the handle member 206 is pushed in a downwards direction. This seal prevents the escape of gases or liquids from the container. The pressurized racking apparatus 200 is removed from the container by pulling upwards on the handle member 206 which, in turn releases the second press 205 from the orifice to which it is applied.

FIGS. 69-75 illustrate that in some preferred embodiments the pressurized racking apparatus 200 may also include a torsion seal assembly 236. The torsion seal assembly 236 is comprised of a plurality of locking fingers 237. The locking fingers 237 are pivotally connected with the flange of the cooperating seal 202. FIG. 69 also illustrates that the torsion seal assembly 236 further comprises an alpha flange 245, and a plurality of beta dowels 246.

The locking fingers 237 comprise a first face 238, a second face 239, a finger spring 240, a channel 241, and a finger orifice 242. The finger orifice is disposed longitudinally between the first face 238 and the second face 239. The finger spring 240 has a primary distal end 243 and a secondary distal end 244. The primary distal end 243 abuts the channel 241.

It should be noted here that there abound a panoply of different ways or means of affixing the torsion seal assembly 236 to the pressurized racking apparatus 200. In particular, the locking fingers may be pivotally affixed to the pressurized racking apparatus 200 in ways or through means discernable to one skilled in the art. For these reasons, the scope of the present invention is not meant to be construed to be limiting as to the method or means of affixing the torsion seal assembly to the pressurized racking apparatus 200.

In addition, FIGS. 43M-43P illustrate how the torsion seal assembly 236 works in operation. FIG. 43O illustrates that the handle member 206 of the pressurized racking apparatus 200 is turned counterclockwise. In turn, the locking fingers 237 retracts inwards which enables the fluid transfer apparatus to be removed from the container as illustrated in FIG. 43P.

FIGS. 69 and 73 illustrate the principal mechanism of the torsion seal assembly 236. In an open configuration as illustrated in FIG. 73, the locking fingers 237 are oriented towards the center of the axis. In the closed or locked configuration, the locking fingers 237 radiate away from the center axis which prevents the pressurized racking apparatus 200 from releasing from the object to which it is affixed. It should be noted here that in some preferred embodiments the torsion seal assembly 236 is optional as illustrated in numerous figures.

FIG. 75 illustrates that in some preferred embodiments the invention may further include a compartment assembly 245. The compartment assembly 245 is comprised of a first cylinder 246, a second cylinder 247 and a ring 248. The first cylinder 246 is sized to mate with the second cylinder 247 and the cooperating seal 202. The second cylinder 247 is sized to mate with the ring 248.

Figure 76:
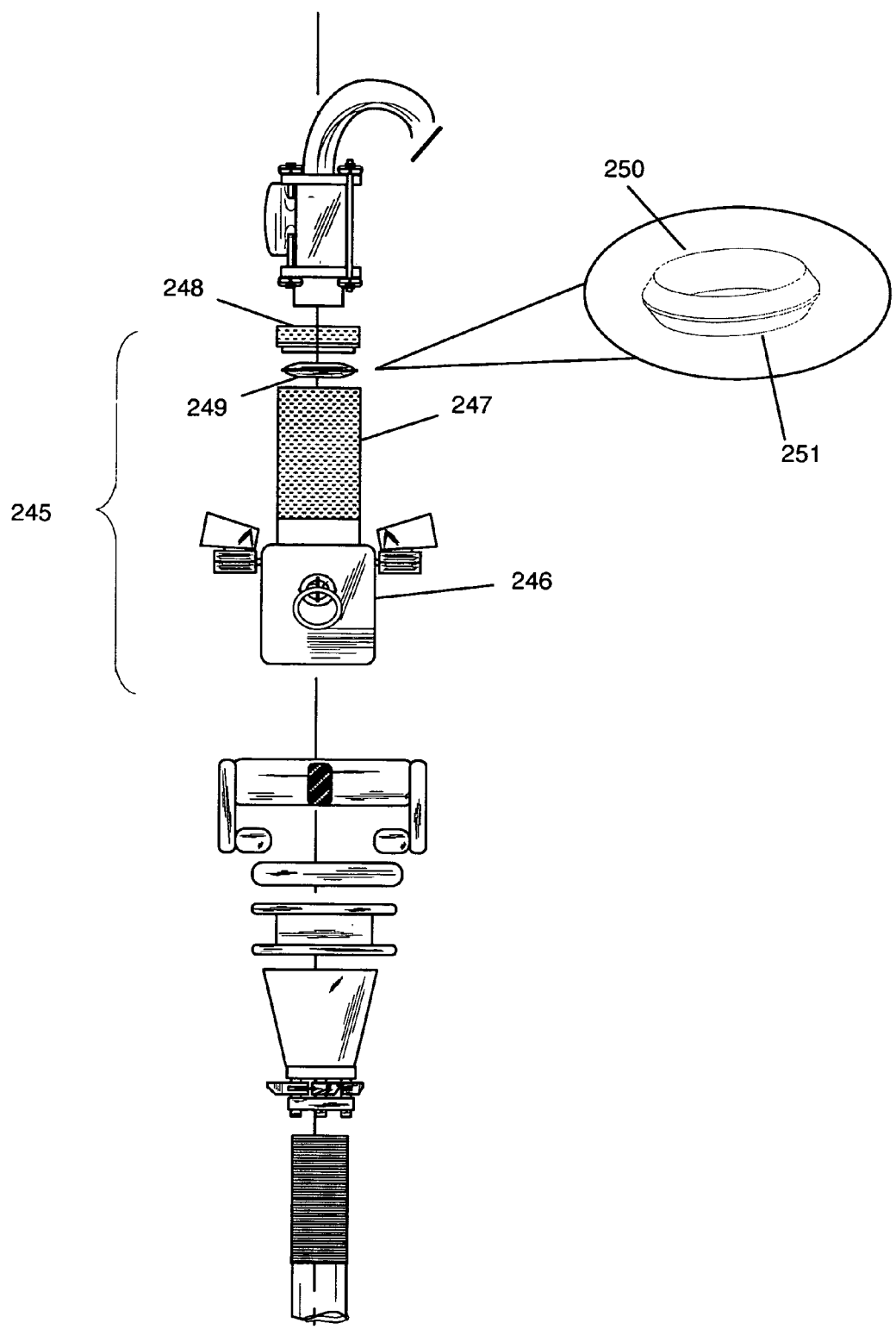
FIG. 76 is a frontal view of a preferred embodiment of the present invention.
Figure 77:
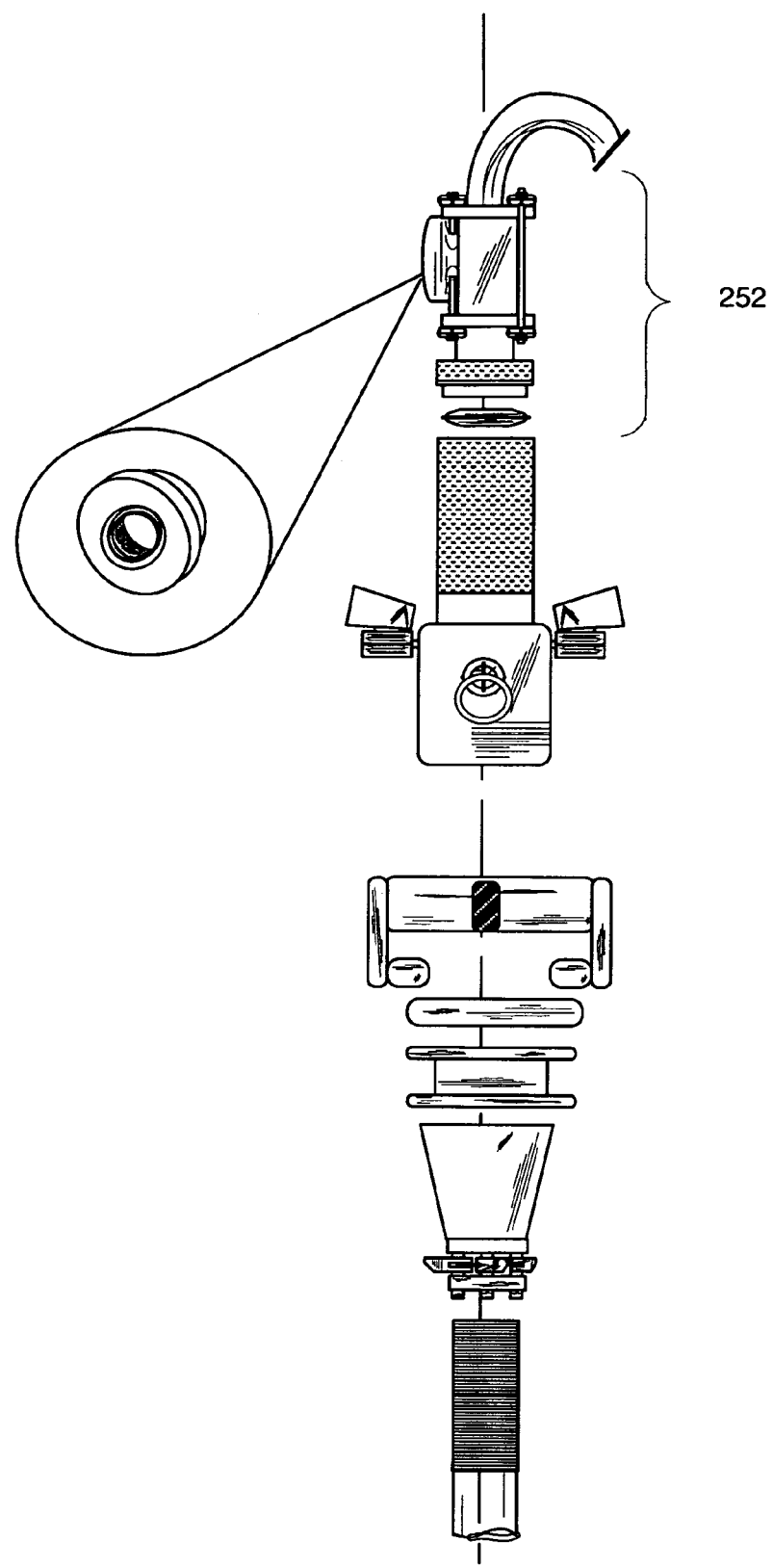
FIG. 77 is a frontal view of a preferred embodiment of the present invention.
Figure 78:
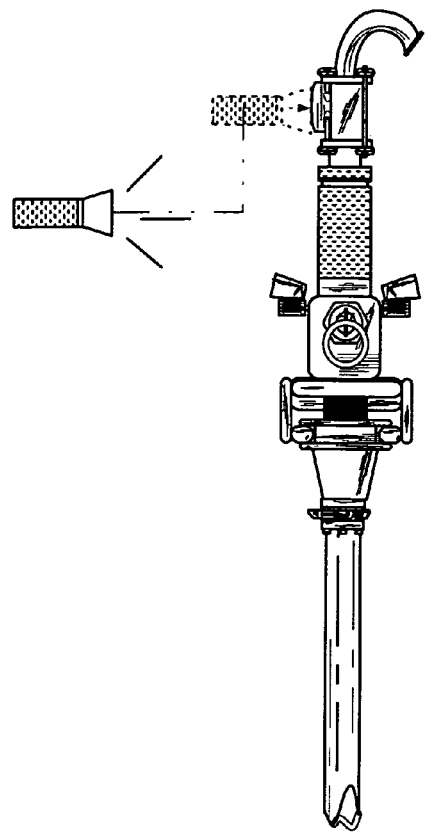
FIG. 78 is a frontal view of a preferred embodiment of the present invention.
Figure 79:
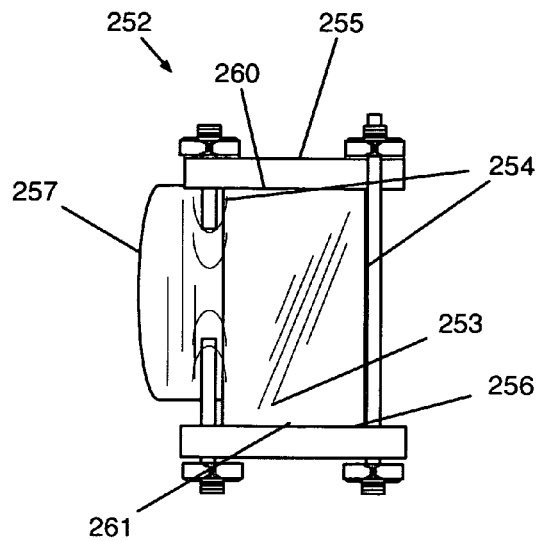
FIG. 79 is a side view of a preferred embodiment of the present invention.
Figure 80:
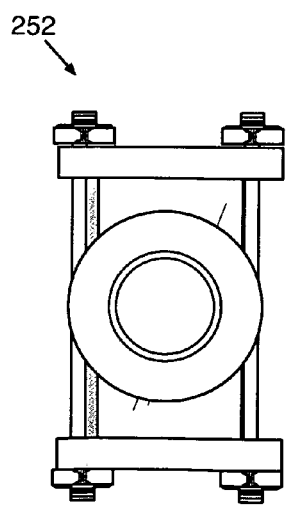
FIG. 80 is a frontal view of a preferred embodiment of the present invention.
Figure 81:
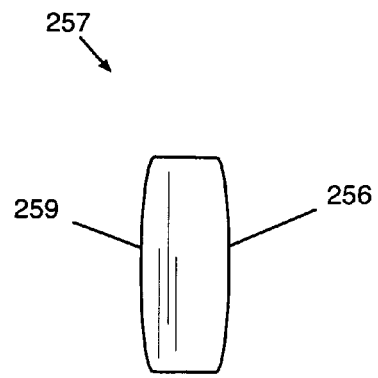
FIG. 81 is a plan view of a preferred embodiment of the present invention.
Figure 82:
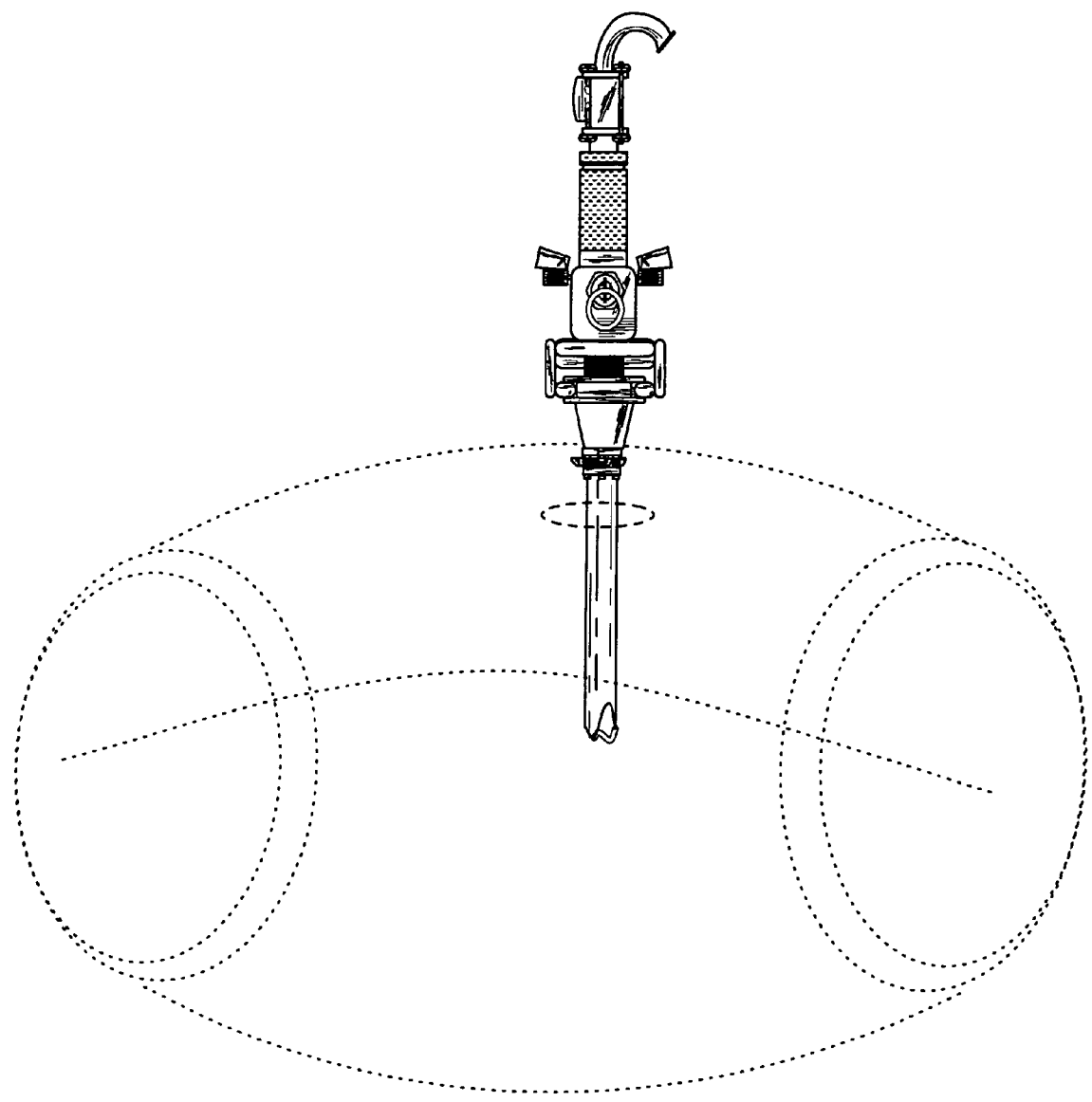
FIG. 82 is a side elevation view of a preferred embodiment of the present invention.

FIG. 76 also illustrates that in some preferred embodiments the pressurized racking apparatus 200 may also include a double-beveled ferrule 249. The double-beveled ferrule 249 is disposed between the ring and the second cylinder 247. The double-beveled ferrule 249 is comprised of an upper edge 250 and a lower edge 251.

FIGS. 77-81 illustrates that in some preferred embodiments the pressurized racking apparatus 200 may further incorporate an inspection assembly 252. The inspection assembly is comprised of a transparent conduit 253, a plurality of supports 254, an gamma flange 255, an omega flange 256 and a holder 257. The holder 257 is a ring shaped member comprised of an interfacing surface 258 and an retaining surface 259. The retaining surface 259 of the holder 257 is sized to mate with a light producing apparatus such as a flashlight.

It should also be noted that FIGS. 40-42 illustrate a wine racking apparatus 300 which incorporates many of the components detailed above. In addition, this wine racking apparatus may further incorporate a conduit 301. This wine racking apparatus may also be used with other alcoholic and non-alcoholic beverages such as beer, spirits, tequila, etc.

It will be apparent to the skilled artisan that there are numerous changes that may be made in embodiments described herein without departing from the spirit and scope of the invention. As such, the invention taught herein by specific examples is limited only by the scope of the claims that follow.

What is claimed is:

1. A fluid transfer apparatus comprising:
a cam locking assembly and a cooperating seal member apparatus;
the cam locking assembly is in communication with the cooperating seal member apparatus;
the cam locking assembly is comprised of a lock handle assembly, a handle ring, and a press ring;
the lock handle assembly is comprised of a U-shaped member and at least two pivot rollers; the U-shaped member is comprised of a first side, a second side, and a third side; the pivot rollers are disposed at the first and second sides of the U-shaped member respectively;
the handle ring is pivotally connected with the lock handle at the first side and the second side of the U-shaped member;
the press ring is a cylindrical member with an upper flange and a lower flange;
the pivot rollers are disposed between the upper flange and the lower flange of the press ring;

the cooperating seal member apparatus is comprised of an elongate cylindrical member and a seal; the elongate cylindrical member is sized to mate with the seal;

the elongate cylindrical member is comprised of a top side and a a seal flange;

the seal abuts the seal flange of the elongate cylindrical member;

the top side of the cooperating seal member apparatus is sized to mate with the press ring and the handle ring of the cam locking assembly.

2. The fluid transfer apparatus of claim 1 further comprising a body assembly;

the body assembly is comprised of a lower cylinder, an upper cylinder and a lock ring;

the lower cylinder is sized to mate with the upper cylinder and the cooperating seal member apparatus;

the upper cylinder is sized to mate with the lock ring.

3. The fluid transfer apparatus of claim 2 further comprising an inspection assembly apparatus;

the inspection assembly apparatus is comprised of a transparent tube, a plurality of dowels, an anterior flange, a posterior flange and a retainer;

the retainer is a ring shaped member comprised of an inner surface and an outer surface;

the outer surface of the retainer is sized to mate with a light producing apparatus;

the transparent tube is comprised of a first end and a second end;

the dowels are disposed around the transparent tube;

the retainer is affixed to at least two dowels at the inner surface of the retainer.

4. The fluid transfer apparatus of claim 2 further comprising a compression ferrule; the compression ferrule is disposed between the lock ring and the upper cylinder;

the compression ring is comprised of an anterior edge and a posterior edge.

5. The wine racking assembly of claim 1 further comprising an inspection assembly apparatus;

the inspection assembly apparatus is comprised of a transparent tube, a plurality of dowels, an anterior flange, a posterior flange and a retainer;

the retainer is a ring shaped member comprised of an inner surface and an outer surface;

the outer surface of the retainer is sized to mate with a light producing apparatus;

the transparent tube is comprised of a first end and a second end;

the dowels are disposed around the transparent tube;

the retainer is affixed to at least two dowels at the inner surface of the retainer.

6. The wine racking apparatus of claim 1 further comprising a compression ferrule; the compression ferrule is disposed between a lock ring and a upper cylinder;

the compression ring is comprised of an anterior edge and a posterior edge.

* * * * *